(12) United States Patent
Ye et al.

(10) Patent No.: US 11,025,905 B2
(45) Date of Patent: Jun. 1, 2021

(54) METHOD AND DEVICE FOR DECODING WITH PALETTE MODE

(71) Applicant: TENCENT AMERICA LLC, Palo Alto, CA (US)

(72) Inventors: Jing Ye, Palo Alto, CA (US); Shan Liu, Palo Alto, CA (US); Xiaozhong Xu, Palo Alto, CA (US); Xiang Li, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/536,460

(22) Filed: Aug. 9, 2019

(65) Prior Publication Data

US 2020/0092546 A1    Mar. 19, 2020

Related U.S. Application Data

(60) Provisional application No. 62/731,767, filed on Sep. 14, 2018, provisional application No. 62/736,353, filed on Sep. 25, 2018, provisional application No. 62/740,920, filed on Oct. 3, 2018.

(51) Int. Cl.
*H04N 19/105* (2014.01)
*H04N 19/186* (2014.01)
*H04N 19/96* (2014.01)

(52) U.S. Cl.
CPC ......... *H04N 19/105* (2014.11); *H04N 19/186* (2014.11); *H04N 19/96* (2014.11)

(58) Field of Classification Search
CPC .. H04N 19/129; H04N 19/182; H04N 19/105; H04N 19/186; H04N 19/96

USPC ...................................................... 375/240.21
See application file for complete search history.

(56) References Cited

U.S. PATENT DOCUMENTS

| | | | |
|---|---|---|---|
| 10,057,587 | B2 | 8/2018 | Zou et al. |
| 2015/0058213 | A1 | 2/2015 | Lee Kim-Koon et al. |
| 2016/0227225 | A1 | 8/2016 | Zou et al. |
| 2016/0309177 | A1 | 10/2016 | Laroche et al. |
| 2016/0373754 | A1 | 12/2016 | Xu et al. |

(Continued)

FOREIGN PATENT DOCUMENTS

WO    2017137311 A1    8/2017

OTHER PUBLICATIONS

Wei Pu, et al., "Palette Mode Coding in HEVC Screen Content Coding Extension", IEEE Journal on Emerging and Selected Topics in Circuits and Systems, Dec. 2016, pp. 420-432, vol. 6, No. 4.

(Continued)

*Primary Examiner* — Jeffery A Williams
(74) *Attorney, Agent, or Firm* — Sughrue Mion, PLLC

(57) ABSTRACT

A method for decoding a video sequence of a coded video stream, performed by at least one processor, using at least one color palette in a palette mode, each of the at least one color palette including at least one luma value or at least one chroma value, the method including determining whether a current tree structure is a dual tree structure where a luma color plane has a split tree structure that is different from a split tree structure of a chroma color plane; and decoding at least one image of the video sequence using one or more color palettes of the at least one color palette based on the determining whether the current tree structure is the dual tree structure.

20 Claims, 18 Drawing Sheets

(56) References Cited

U.S. PATENT DOCUMENTS

2017/0374372 A1    12/2017   Liu et al.
2020/0260096 A1*   8/2020   Ikai ..................... H04N 19/46

OTHER PUBLICATIONS

Written Opinion dated Dec. 23, 2019 from the International Bureau in Application No. PCT/US2019/047019.
International Search Report dated Dec. 23, 2019 from the International Bureau in Application No. PCT/US2019/047019.

* cited by examiner

METHOD AND DEVICE FOR DECODING WITH PALETTE MODE

CROSS-REFERENCE TO RELATED APPLICATION

This application claims priority from U.S. Provisional Application No. 62/731,767, filed on Sep. 14, 2018, U.S. Provisional Application No. 62/736,353, filed on Sep. 25, 2018, and U.S. Provisional Application No. 62/740,920, filed on Oct. 3, 2018, the disclosures of which are incorporated herein by reference in their entirety.

FIELD

This disclosure is directed to a set of advanced video coding technologies. More specifically, palette-based coding and decoding processes.

BACKGROUND

Due to specific characteristics of screen contents, coding tools were developed for Screen Coding Extension of HEVC. The tools demonstrate significant gains in coding efficiency. Among them, the palette mode represents block of pixels using indices to the palette (major colors), and encode the palette and the indices by exploiting spatial redundancy. A typical palette mode coding method is composed of two parts: coding methods for the palette and coding methods for the samples using the palette. The latter part is composed of palette index coding, run length coding, and escape pixel coding.

SUMMARY

According to an embodiment of the present disclosure, a method for decoding a video sequence of a coded video stream, performed by at least one processor, using at least one color palette in a palette mode, each of the at least one color palette including at least one luma value or at least one chroma value, is provided. The method comprises determining whether a current tree structure is a dual tree structure where a luma color plane has a split tree structure that is different from a split tree structure of a chroma color plane; and decoding at least one image of the video sequence using one or more color palettes of the at least one color palette based on the determining whether the current tree structure is the dual tree structure.

According to an embodiment of the present disclosure, the method further comprises updating a palette predictor list, the updating includes providing, in a case where the current tree structure is determined to be the dual tree structure, a first luma value of a first palette of the at least one color palette to the palette predictor list and ignoring all chroma values of the first palette, such that no chroma value of the first palette is provided to the palette predictor list, wherein the decoding the at least one image comprises decoding the at least one image of the video sequence by predicting a second palette of the at least one color palette using the palette predictor list.

According to an embodiment of the present disclosure, the method further comprises receiving a palette predictor initializer; initializing, in the case where the current tree structure is determined to be the dual tree structure, the palette predictor list with a luma value signaled by palette predictor initializer; and setting, in the case where the current tree structure is determined to be the dual tree structure, a chroma value of the palette predictor list with a predefined value, without the palette predictor initializer signaling any chroma value to the palette predictor list.

According to an embodiment of the present disclosure, the method further comprises receiving, in a case where the luma color plane is to be decoded while the current tree structure is determined to be the dual tree structure, a signal indicating a luma value of an escape pixel without receiving any signal indicating a chroma value of the escape pixel to be used in the palette mode, wherein the decoding the at least one image comprises using the luma value of the escape pixel in the palette mode.

According to an embodiment of the present disclosure, the method further comprises receiving, in a case where the current tree structure is determined to be the dual tree structure, a signal indicating whether a current chroma block is to be decoded using the palette mode; and determining whether the current chroma block is to be decoded using the palette mode based on the signal, wherein the decoding the at least one image comprises decoding the current chroma block using a palette of the at least one color palette in the case where the signal indicates the current chroma block is to be decoded using the palette mode.

According to an embodiment of the present disclosure, the signal indicating whether the current chroma block is to be decoded using the palette mode is received based on at least one of co-located luma blocks being in the palette mode.

According to an embodiment of the present disclosure, the method further comprises determining whether at least one luma block, co-located to a current chroma block, is using the palette mode; determining whether a current chroma block is to be using the palette mode based on the determining whether the at least one luma block is using the palette mode, wherein the decoding the at least one image comprises decoding the current chroma block using a palette of the at least one color palette in the case where the current chroma block is to be decoded using the palette mode.

According to an embodiment of the present disclosure, the at least one luma block is a plurality of luma blocks co-located to the current chroma block, and the current chroma block is determined to be using the palette mode based on all of the plurality of luma blocks being determined to be using the palette mode.

According to an embodiment of the present disclosure, the at least one luma block is a plurality of luma blocks co-located to the current chroma block, and the current chroma block is determined to be using the palette mode based on a number of the plurality of luma blocks, greater than a predetermined threshold, being determined to be using the palette mode.

According to an embodiment of the present disclosure, the at least one image decoded is a part of a video with three color components, the at least one color palette comprises a respective color palette table for each of the three color components, and the method further comprises predicting the respective color palettes tables for each of the three color components using a respective palette predictor list for each of the three color components.

According to an embodiment of the present disclosure, a method for decoding a video sequence of a coded video stream, performed by at least one processor, using at least one color palette in a palette mode is provided. The method comprises generating a first palette predictor list, the generating comprising determining whether at least one neighboring block of a current block is in the palette mode; and inserting at least one palette entry from a neighboring block of the at least one neighboring block into the first palette predictor list, based on the neighboring block being determined to be in palette mode. The method further comprises generating a second palette predictor list of the current block; generating a combined palette predictor list by combining at least one palette entry of the first palette predictor list with at least one palette entry of the second palette predictor list; and decoding the current block of the video sequence using the combined palette predictor list, the decoding including predicting a palette of the at least one color palette using the combined palette predictor list.

According to an embodiment of the present disclosure, the inserting the at least one palette entry from the neighboring block includes inserting, into the first palette predictor list, a palette entry from each of the plurality of neighboring blocks that is determined to be in the palette mode.

According to an embodiment of the present disclosure, the at least one neighboring block of the current block includes adjacent neighboring blocks, the adjacent neighboring blocks include: a first neighboring block that has a bottom-right corner that is located directly adjacent to a bottom-left corner of the current block, a second neighboring block that has a bottom-right corner that is located directly adjacent to a top-right corner of the current block, a third neighboring block that has a bottom-left corner that is located directly adjacent to the top-right corner of the current block, a fourth neighboring block that has a top-right corner that is located directly adjacent to the bottom-left corner of the current block, and a fifth neighboring block that has a bottom-right corner that is located directly adjacent to a top-left corner of the current block.

According to an embodiment of the present disclosure, the at least one neighboring block of the current block further includes a plurality of distanced blocks, each of the plurality of distanced blocks having a position corresponding to a position of a respective one of the adjacent neighboring blocks, at a respective offset distance away from the respective one of the adjacent neighboring blocks such that the plurality of distanced blocks are distanced from the current block.

According to an embodiment of the present disclosure, the determining whether the at least one neighboring block of the current block is in the palette mode comprises: determining whether each of the adjacent neighboring blocks are in the palette mode; and determining, whether each of the plurality of distanced blocks are in the palette mode, after determining whether each of the adjacent neighboring blocks are in the palette mode.

According to an embodiment of the present disclosure, the generating the combined palette predictor list comprises: inserting the at least one palette entry of the first palette predictor list into the combined palette predictor list; and inserting one or more of the at least one palette entry of the second palette predictor list into the combined palette predictor list, after the inserting the at least one palette entry of the first palette predictor list, until the combined palette predictor list reaches a predefined or signaled size limit.

According to an embodiment of the present disclosure, the generating the combined palette predictor list comprises: inserting the at least one palette entry of the second palette predictor list into the combined palette predictor list; and inserting one or more of the at least one palette entry of the first palette predictor list into the combined palette predictor list, after the inserting the at least one palette entry of the second palette predictor list, until the combined palette predictor list reaches a predefined or signaled size limit.

According to an embodiment of the present disclosure, the generating the first palette predictor list further comprises determining whether a difference between a color of the at least one palette entry of the neighboring block and a color of a palette entry already provided in the first palette predictor list is larger than a predetermined threshold, and the at least one palette entry from the neighboring block is inserted into the first palette predictor list based on the neighboring block being determined to be in palette mode and the difference between the color of the at least one palette entry and the color of the palette entry already provided in the first palette predictor list being determined to be larger than the predetermined threshold.

According to an embodiment of the present disclosure, the generating the combined palette predictor list comprises: determining whether a difference between one of a color of an entry of the at least one palette entry of the first palette predictor list and a color of an entry of the at least one palette entry of the second palette predictor list, and a color of a palette entry already provided in the combined palette predictor list is larger than a predetermined threshold; and inserting the entry of the at least one palette entry of the first palette predictor list or the entry of the at least one palette entry of the second palette predictor list that is used in the determining the difference, into the combined palette predictor list, based on determining that the difference between the one of the color of the entry of the first palette predictor list and the color of the entry of the second palette predictor list, and the color of the palette entry already provided in the combined palette predictor list is larger than the predetermined threshold.

According to an embodiment of the present disclosure, provided is a non-transitory computer-readable storage medium storing instructions that cause at least one processor to: determine whether a current tree structure is a dual tree structure where a luma color plane has a split tree structure that is different from a split tree structure of a chroma color plane; and decoding at least one image of a video sequence using one or more color palettes of an at least one color palette in a palette mode based on determining whether the current tree structure is the dual tree structure, wherein each of the at least one color palette includes at least one luma value or at least one chroma value.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
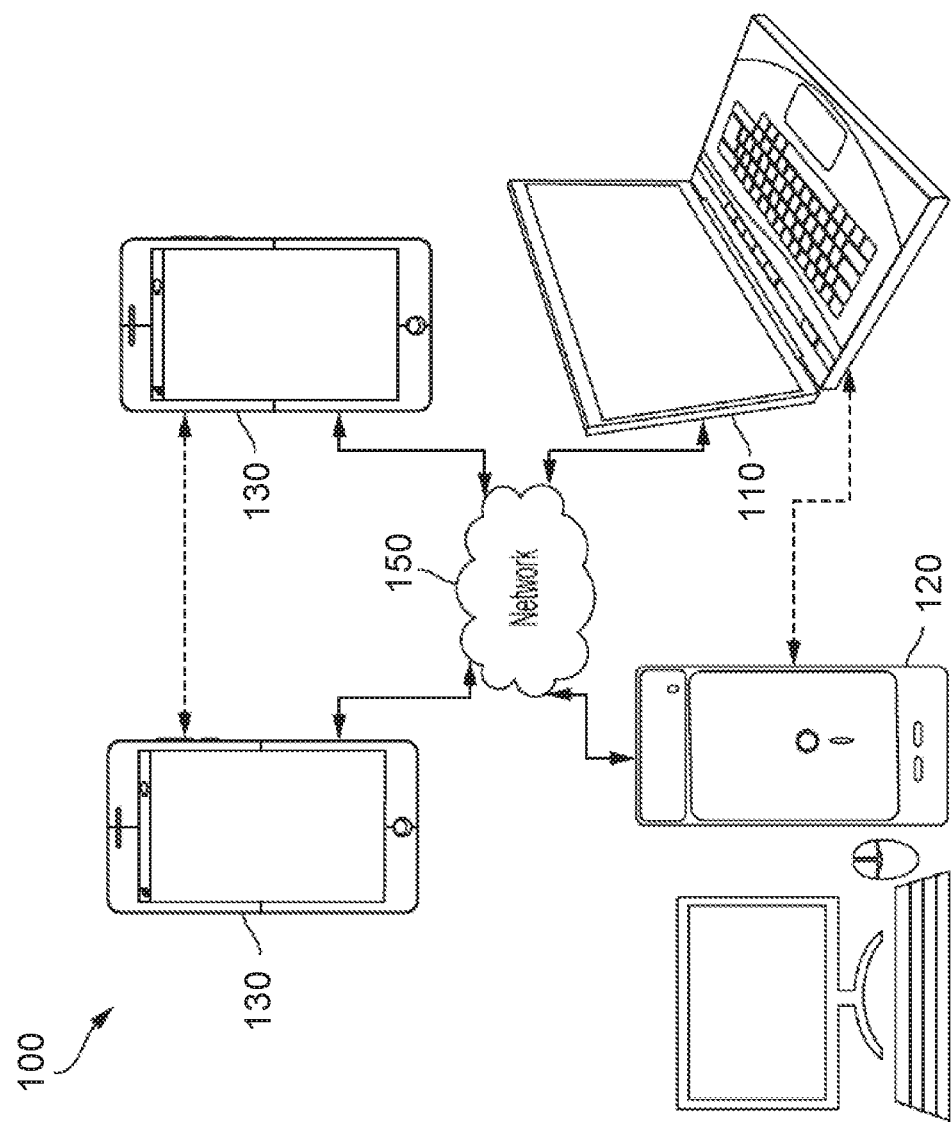
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be, for example, servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140) including, for example, wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
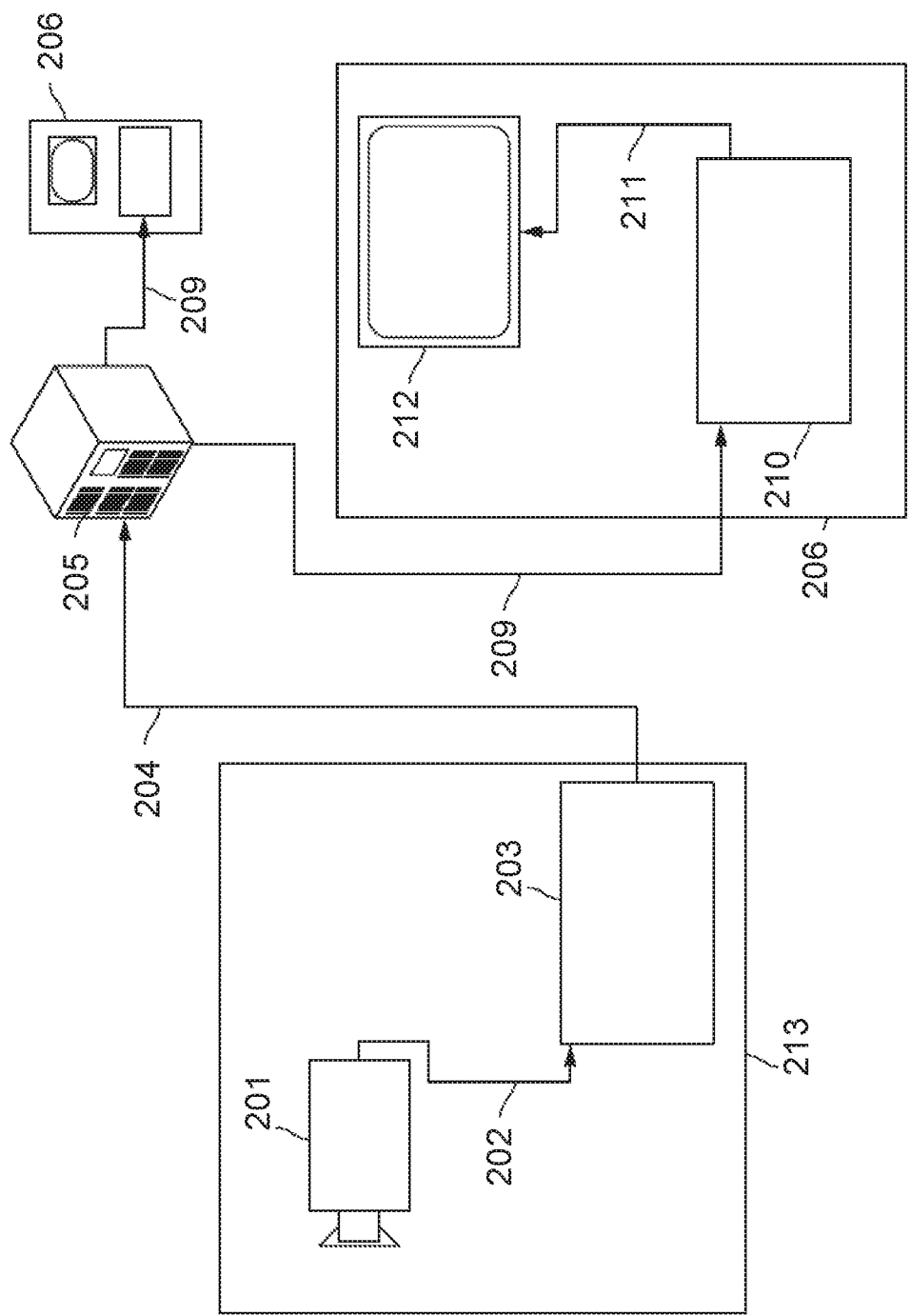
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system (200) may include a capture subsystem (213), that includes a video source (201) and an encoder (203). The streaming system (200) may further include at least one streaming server (205) and/or at least one streaming client (206).

The video source (201) can create, for example, an uncompressed video sample stream (202). The video source (201) may be, for example, a digital camera. The sample stream (202), depicted as a bold line to emphasize a high data volume when compared to encoded video bitstreams, can be processed by the encoder (203) coupled to the camera (201). The encoder (203) can include hardware, software, or a combination thereof to enable or implement aspects of the disclosed subject matter as described in more detail below. The encoder (203) may also generate an encoded video bitstream (204). The encoded video bitstream (204), depicted as a thin line to emphasize a lower data volume when compared to the uncompressed video sample stream (202), can be stored on a streaming server (205) for future use. One or more streaming clients (206) can access the streaming server (205) to retrieve video bit streams (209) that may be copies of the encoded video bitstream (204).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
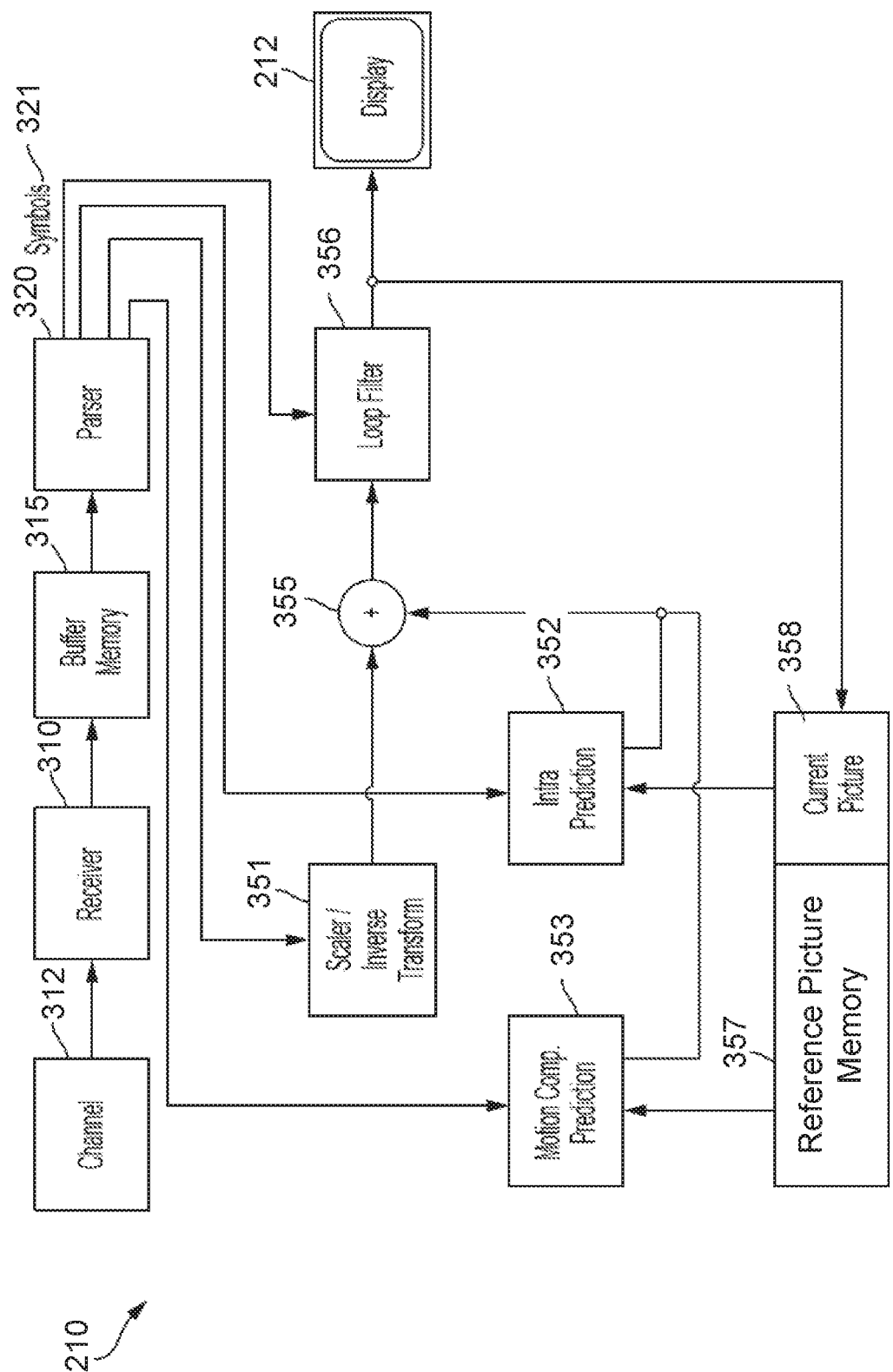
FIG. 3 is a schematic illustration of a simplified block diagram of a video decoder and a display in accordance with an embodiment.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory (358). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosychronous network, the buffer (315) may not be used, or can be small. For use on best effort packet networks such as the Internet, the buffer (315) may be required, can be comparatively large, and can be of adaptive size.

The video decoder (210) may include the parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are invoiced, can be controlled by the subgroup control information that was parsed from the coded video sequence by the parser (320). The flow of such subgroup control information between the parser (320) and the multiple units described below is not depicted for clarity.

Beyond the functional blocks already mentioned, the decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks comprising sample values that can be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by the intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access the reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from where the Motion Compensation Prediction unit (353) fetches prediction samples, can be controlled by motion vectors. The motion vectors may be available to the Motion Compensation Prediction unit (353) in the form of symbols (321) that can have, for example x, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture stored in the current picture memory (358) can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
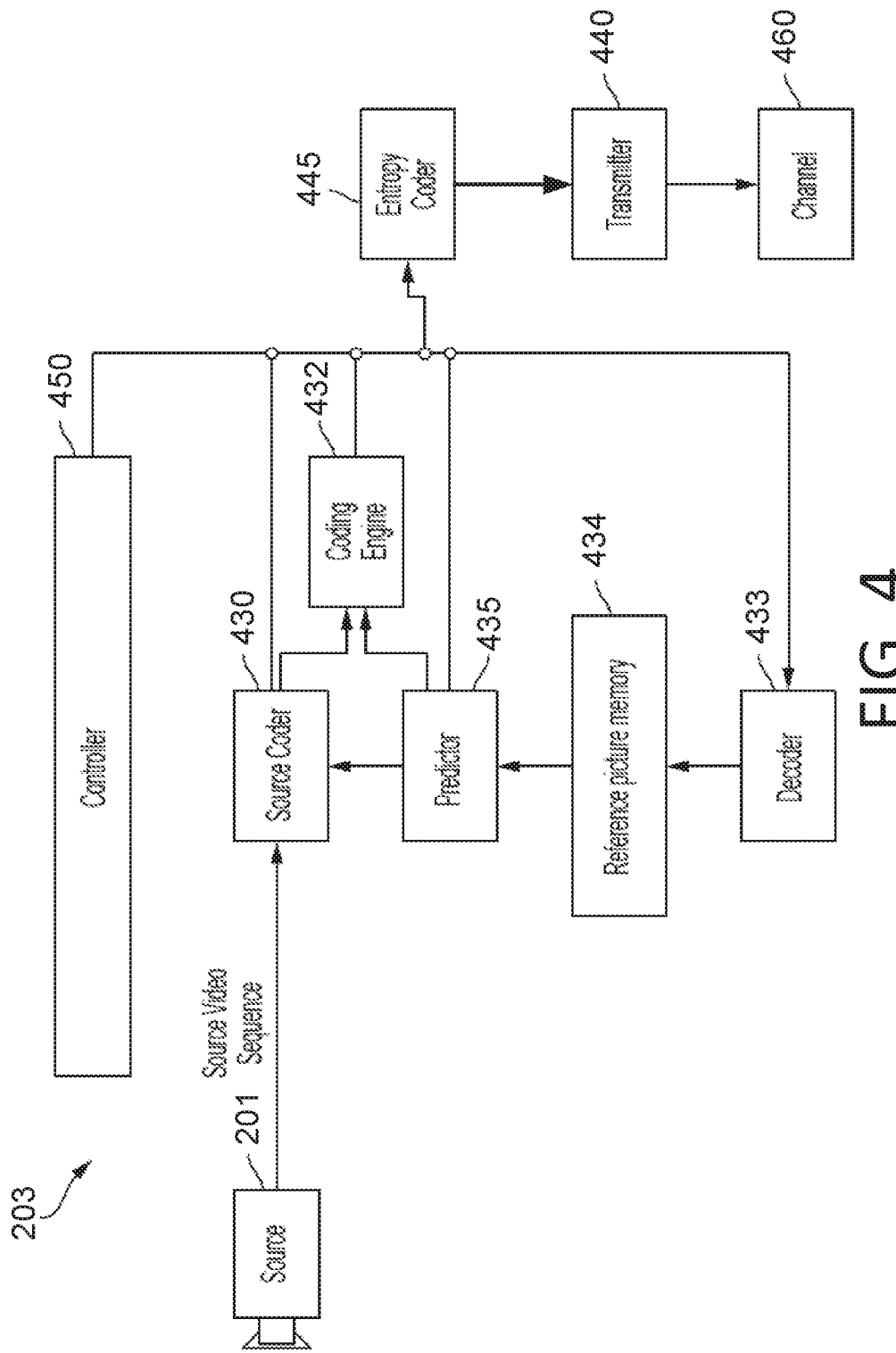
FIG. 4 is a schematic illustration of a simplified block diagram of a video encoder and a video source in accordance with an embodiment.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: x bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed may be one function of the controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As a simplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create, when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be substantially the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer (315), and parser (320) may not be fully implemented in the local decoder (433).

An observation that can be made at this point is that any decoder technology, except the parsing/entropy decoding that is present in a decoder, may need to be present in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data is decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The encoders and decoders of the present disclosure may perform palette coding and decoding processes, respectively. Some aspects of palette coding and decoding processes are described below.

1. Selecting Major Colors

A very simple but efficient histogram based algorithm may be used to classify pixels. In specific, the most significant L peak values in the histogram may be selected as major colors, and the pixel values that are close to a major color may be quantized to the major color. Other pixels which do not belong to any major color sets are escape pixels, which may also may be quantized before coding. For lossless coding, the quantization processes may not be used. For each pixel, a color index may be assigned to indicate which color set it belongs to. The color index may also be referred as an index for convenience when the term will not cause any confusion. If L major colors are used, the values of major colors 0 to (L−1) may be signaled for the set of L major colors and the value of major color N may be signaled for the escape pixel set. The palette may be implemented as a color lookup table in which each color entry is associated with an index. A single palette may be used to code both luma and chroma components. Each entry may represent a specific RGB(YUV) color. For example, entry 1 with (R, G, B)=(0, 0, 0) may represent pure black color while entry 0 with (R, G, B)=(2, 10, 200) may represent a bluish color. When the video format is 420, the chroma plane may be up sampled to generate the color palette table.

2. Palette Mode Coding

The palette-based coding and decoding may be performed on a CU basis.

2.1 Palette Predictor Initializer:

In a comparative embodiment, slices and tiles can result in substantial coding efficiency loss as the palette predictor list is assumed to reset at the slice and tile boundaries. After the reset, it takes time to rebuild the palette predictor list. A palette initializer with predefined entries can be optionally used to initialize the palette predictor list, resulting in improved coding efficiency in such a scenario. A palette initializer can be signaled in the picture parameter set (PPS) or the sequence parameter set (SPS). At the start of the slice or tile, the palette predictor may be initialized by the palette initializer. Each of the three components of the palette initializer may be signaled. The palette predictor list entries may also be three component entries. Each of the entries of the palette predictor may be copied from the palette predictor initializer.

2.2 Encoding the Palette Entries and Palette Information

To code (or decode) the current palette using the palette predictor list as a reference, a binary vector may be used to indicate whether each entry in the palette predictor list is reused in the current palette. The reused entries may be placed at the beginning of the current palette, maintaining their order in the palette predictor list. This may be followed by new palette entries which are not in the palette predictor list. A palette initializer with predefined entries can be used to initialize the palette predictor list, resulting in improved coding efficiency in such a scenario. A palette initializer can be signaled in the picture parameter set (PPS) or the sequence parameter set (SPS).

Palette Predictor List: In HEVC SCC, a palette predictor list stores the previously coded (or decoded) palette entries as references to predict the current palette. This list may be updated after each palette mode CU. It may operate like a least recently used cache. The latest palette may be inserted at the beginning of the list and the entries from the farthest CUs in scan order may be discarded if the list size exceeds a threshold. The upper bound on the size of the palette predictor list is (indirectly) signaled in the SPS header. In a configuration, it is chosen to be roughly twice the size of the palette size limit. This palette predictor list is called history palette predictor list (HPPL) in the present disclosure.

To code (or decode) the current palette using the palette predictor list as a reference, a binary vector may be used to indicate whether each entry in the palette predictor list is reused in the current palette. If the reuse flag is 1, the three components of the entries in the predictor may be copied to the current palette table. The reused entries may be placed at the beginning of the current palette, maintaining their order in the palette predictor list. This may be followed by new palette entries which are not in the palette predictor list. The new palette entries may also be in three components. These new palette entries may be signaled.

2.3 Encoding the Escape Value

Once the palette is constructed, samples within the CU can be classified into two categories. A sample belonging to the first category is the same or very close to an entry in the palette. In this case, the sample can be represented by the index of its corresponding entry in the palette. It may be up to the encoder to define a distortion metric and a threshold to determine whether a sample is close enough to a palette entry. Example distortion metrics used are sum of absolute differences (SAD) and sum of squared errors (SSE). The decoder can reconstruct the sample by looking up the palette entry using the corresponding index. These samples are referred to as indexed samples. For samples belonging to the other category, each sample is significantly different from any entry in the palette. These samples may not be suitable to be represented by a palette index and are referred to as escape samples. The color component values of the escape samples may be quantized and explicitly coded in the bitstream.

3. Separate Coding Tree Structure for Luma and Chroma Components

In some embodiments, a coding unit contains samples of both the luma and chroma components. Samples of chroma component may have an independent or separate split tree structure as compared to samples of luma component. In some embodiments, such a separate coding tree structure starts from CTU level. In an embodiment, the I slice is coded with separate tree structure, and is called "dual tree" on. P/B slice may be coded with uniformed tree structure for luma plane and chroma plane, and it is called "dual tree" off. The dual tree enable flag may be signaled at sequence parameter set (SPS). The luma plane and chroma plane may be indicated by channel type, when the channel type is luma, it is luma plane. When the channel type is chroma, it is chroma plane.

4. Separate Palette Mode for Luma and Chroma Plane

In the proposal JVET-L0336, a separate palette mode for luma and chroma are proposed when dual tree is enabled. Luma and chroma have their own palette table, and palette index map.

5. Extended Merge Mode

Additional merge candidates may be a direct extension of the HEVC merge candidates. The left (reference blocks A1-A3), above (reference blocks B1-B3), left bottom (reference blocks D1-D3), above right (reference blocks C1-C3), and top left (reference blocks E1-E3) candidates (530) that are not immediately next to the current block (510) may be checked. In an embodiment, the maximum number of merge candidates may be 8. The detailed positions of example merge candidates are illustrated in FIG. 5.

Figure 5:
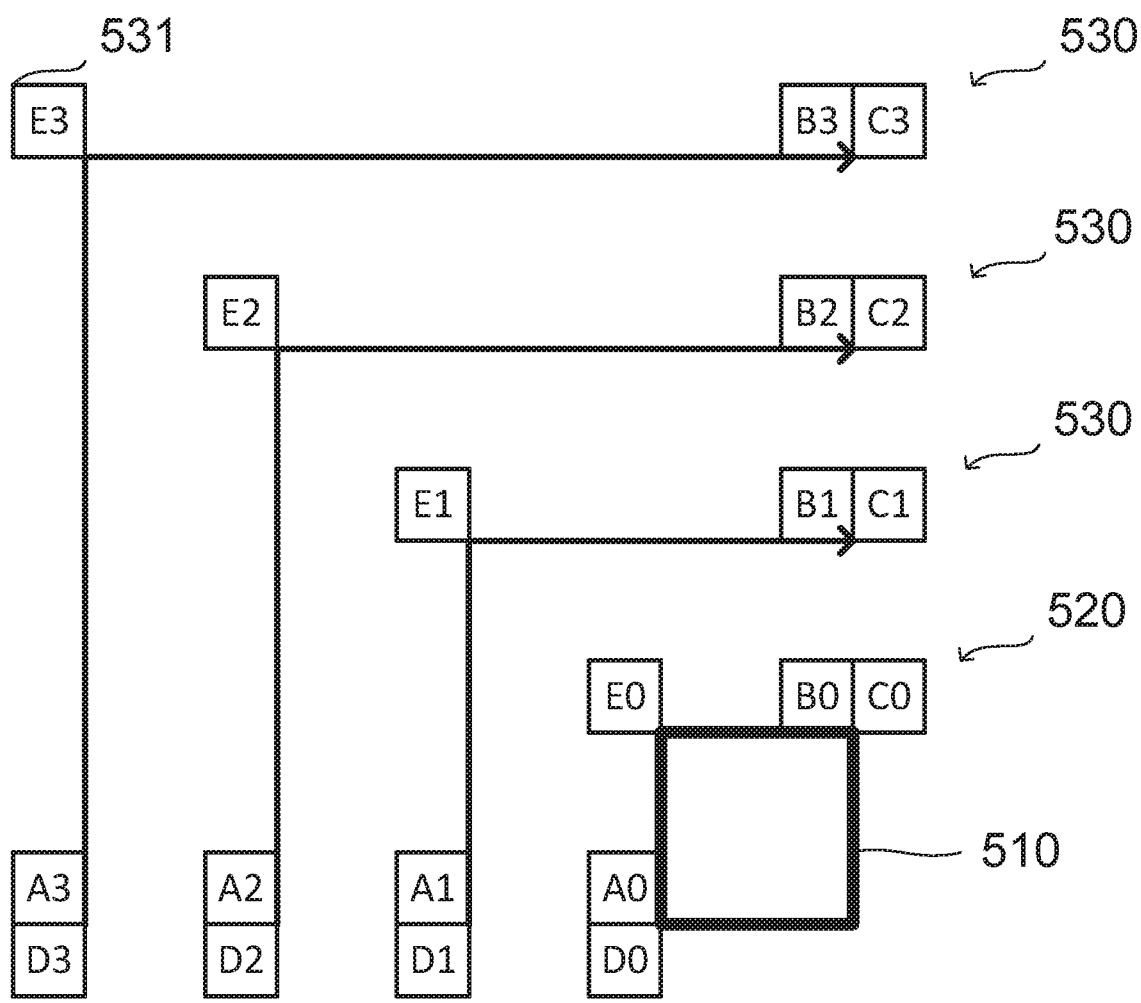
FIG. 5 is diagram illustrating a search pattern for merge candidates of a current block.

As illustrated in FIG. 5, the top left corner (531) of the reference block E3 has an offset of (−96, −96) to the current block (510). Each candidate reference block Bi or Ci has an offset of height in the vertical direction compared to its previous B or C candidates. Each candidate reference block Ai or Di has an offset of block width in the horizontal direction compared to its previous A or D candidates. Each candidate reference block Ei has an offset of width and height in both horizontal direction and vertical direction compared to its previous E candidates. The candidates may be checked from inside to the outside. And the order of the candidates may be, for example, Ai, Bi, Ci, Di, and Ei, wherein an "i" represents any integer.

Figure 6:
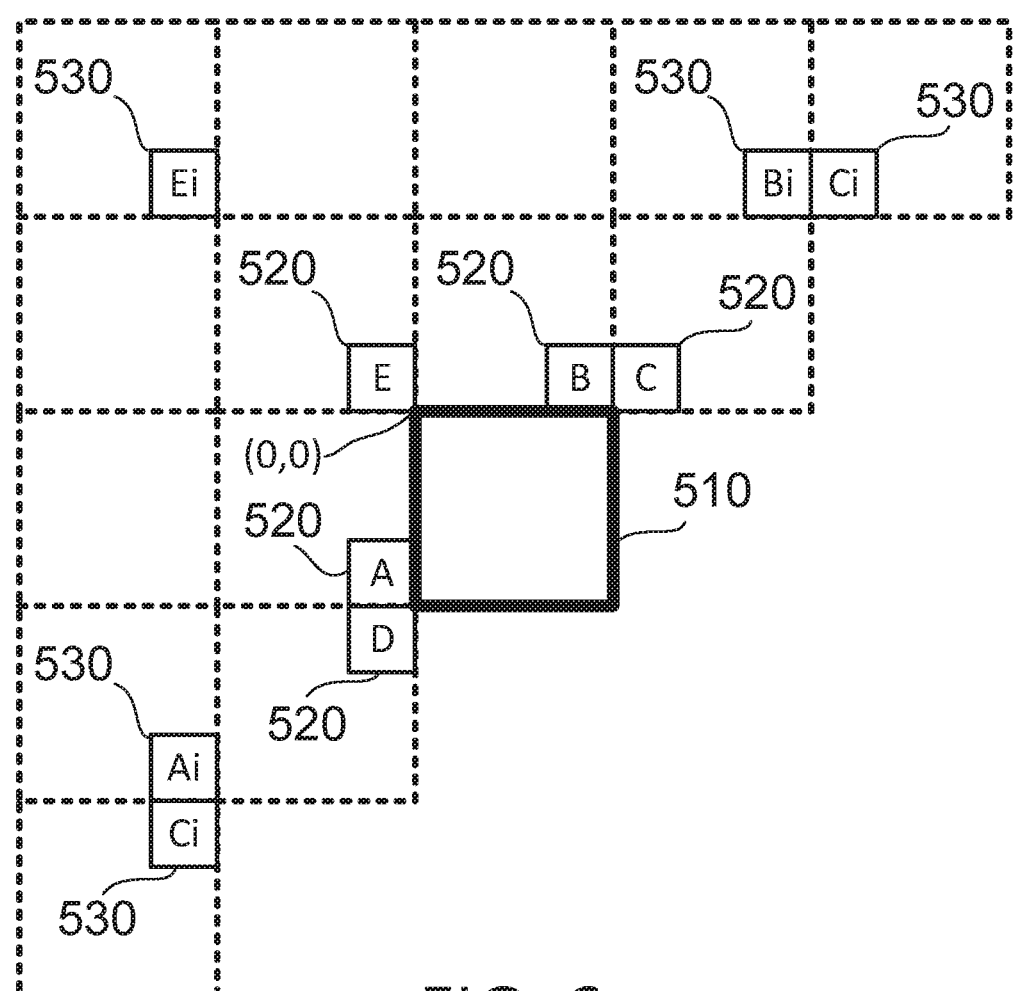
FIG. 6 is a diagram illustrating a search pattern for merge candidates of a current block.
Figure 7:
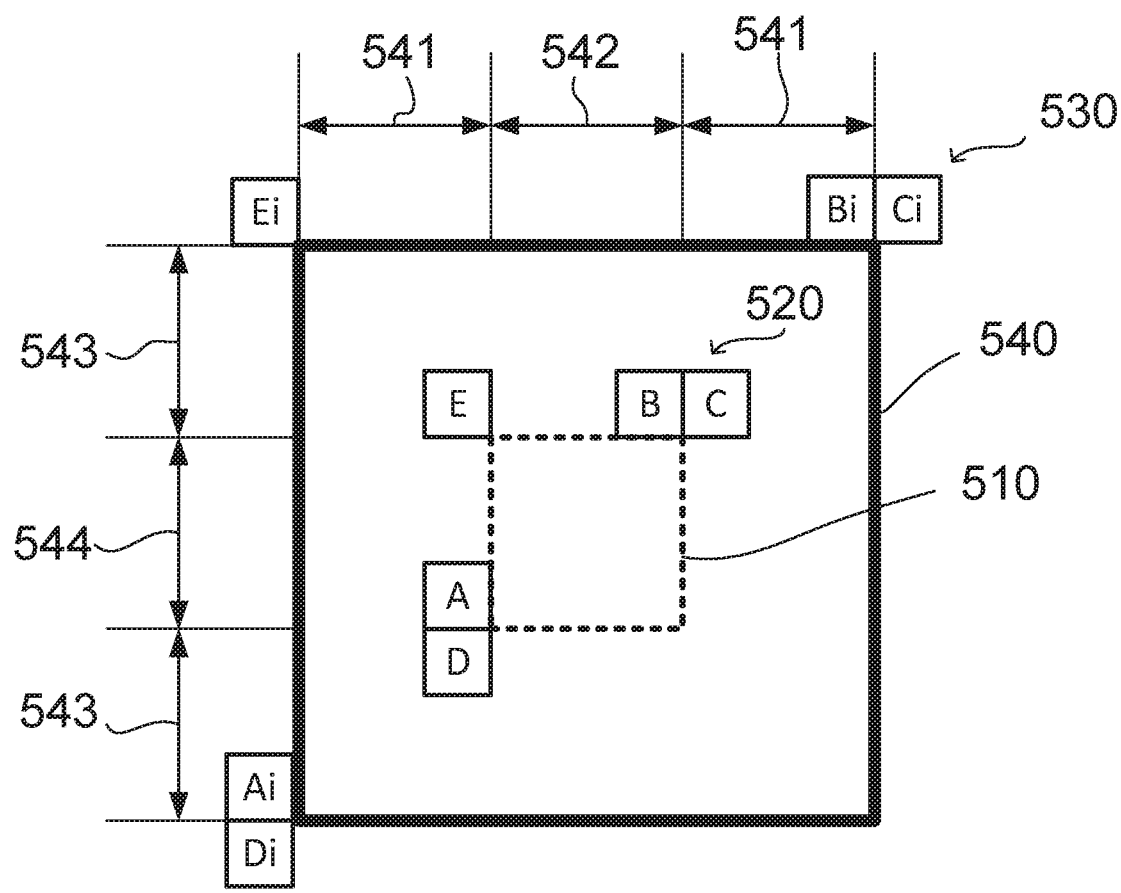
FIG. 7 is a diagram illustrating a new block generated from a current block.

In some embodiments, the candidate reference blocks Ai, Bi, Ci, Di may all be extended in the diagonal direction as illustrated in FIGS. 6-7. For each i round, it can be treated as generating a new block (540), as illustrated in FIG. 7. The top left corner of the candidate reference blocks (520 and 530) have an offset to the current block (510). The offset may be calculated as below:

$$\text{Offset}x=-i*\text{grid}X\ \text{Offset}y=-i*\text{grid}Y$$

In the above equation, gridX (541) and gridY (543) is the grid size of the search. And the Offsetx and Offsety denote the offset of the new block (540) to the current block (510). The gridX (541) and gridY (543) can be fixed, or the gridX (541) can be the current block width (542), and the gridY (543) can be the current block height (544). The width and height of the new block (540) may be calculated as below:

$$\text{newWidth}=i*2*\text{grid}X+\text{width newHeight}=i*2*\text{grid}Y+\text{height}.$$

In the above equation, the width and height are the current block width (542) and height (544). The newWidth and newHeight are the new block width and height. In this case, the extended non-adjacent merge candidates, reference blocks (530), can be treated as an extension of the current block (510). The Ai, Bi, Ci, Di, Ei reference blocks (530) are the above, left, above right, left bottom, above left candidates of the new block 540.

Figure 8:
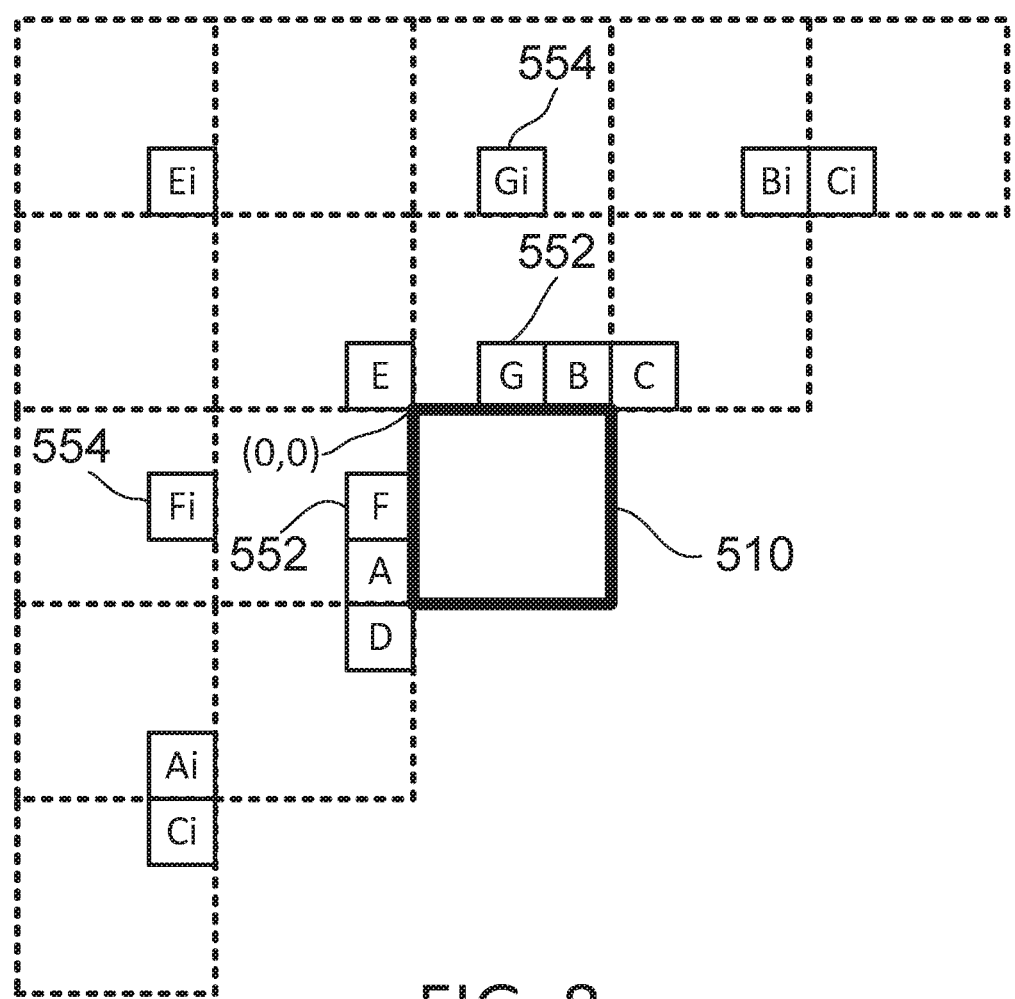
FIG. 8 is a diagram illustrating a search pattern for merge candidates of a current block.

In some embodiments, additional middle candidates are added to the search pattern. For example, as illustrated in FIG. 8, a middle candidate may be added from an adjacent position (552), or the middle candidate may be added from the non-adjacent position (554).

The top left of a new block may be treated as (Sx,Sy). The above middle position Gi may be calculated as (Sx+(newWidth>>1), Sy−4), the left middle position Fi can be calculated as (Sx−4, Sy+(newHeight>>1), the above middle position may also be calculated as (Sx+(newWidth>>1)−4, Sy−4), the left middle position can be calculated as (Sx−4, Sy+(newHeight>>1)−4).

Example Aspects

Some example aspects of embodiments of palette coding and decoding processes of the present disclosure are described below.

[First Aspect]

The same palette structure may be used when dual-tree is on or off. Dual tree can be turn on or off in the SPS level based on different slice types. For example, when the slice type is intra slice, the dual tree may be on. And when the slice type is inter slice, dual tree may be off.

Embodiments of the present disclosure that include the "First Aspect" may resolve the problem of, when luma and chroma color planes are coded separately, one palette table with multiple color components not being able to be applied on the separate color planes.

Figure 9:
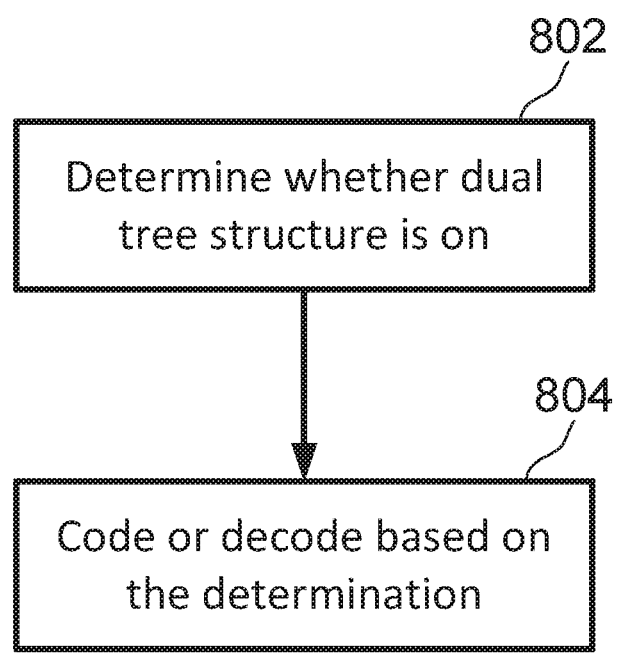
FIG. 9 is a functional block diagram of a video encoder or decoder according to an embodiment of the present disclosure.

As shown in FIG. 9, in an embodiment, an encoder or a decoder may determine whether a current tree structure is a dual tree structure where a luma color plane has a split tree structure that is different from a split tree structure of a chroma color plane (802), and then code or decode at least one image of a video sequence using one or more color palettes based on the determining whether the current tree structure is the dual tree structure (804).

For example, when dual tree is off, the SCC palette mode may be used for the coding or decoding. When the dual tree is on, some modification to the SCC palette mode may occur for the coding or decoding. The following describes non-limiting example modification to the SCC palette mode.

1. Modification to the Palette Predictor Initialization

When the dual tree is on, the palette predictor initializer only signals the luma value, the chroma value is discarded.

When the dual tree is on for the current slice, when initializing the palette predictor list for the current slice, only the luma value is initialized and chroma value is padded with a predefined value.

Example SPS and PPS syntax tables based on HEVC syntax are provided below wherein the luma plane and chroma plane have a different coding tree structure.

SPS Syntax

| | Descriptor |
|---|---|
| sps_scc_extension( ) { | |
|     sps_curr_pic_ref_enabled_flag | u(1) |
|     palette_mode_enabled_flag | u(1) |
|     if( palette_mode_enabled_flag ) { | |
|         palette_max_size | ue(v) |
|         delta_palette_max_predictor_size | ue(v) |
|         sps_palette_predictor_initializer_present_flag | u(1) |
|         if( sps_palette_predictor_initializer_present_flag ) { | |
|             sps_num_palette_predictor_initializer_minus1 | ue(v) |
|             numComps = ( chroma_format_idc = = 0 \|\| isdualtree) ? 1 : 3 | |
|             for( comp = 0; comp < numComps; comp++ ) | |
|                 for( i = 0; i <= sps_num_palette_predictor_initializer_minus1; i++ ) | |
|                     sps_palette_predictor_initializers[ comp ][ i ] | u(v) |
|         } | |
|     } | |
|     motion_vector_resolution_control_idc | u(2) |
|     intra_boundary_filtering_disabled_flag | u(1) |
| } | |

PPS Syntax

| | Descriptor |
|---|---|
| pps_scc_extension( ) { | |
|     pps_curr_pic_ref_enabled_flag | u(1) |
|     residual_adaptive_colour_transform_enabled flag | u(1) |
|     if( residual_adaptive_colour_transform_enabled_flag ) { | |
|         pps_slice_act_qp_offsets_present_flag | u(1) |
|         pps_act_y_qp_offset_plus5 | se(v) |
|         pps_act_cb_qp_offset_plus5 | se(v) |
|         pps_act_cr_qp_offset_plus3 | se(v) |
|     } | |
|     pps_palette_predictor_initializer_present_flag | u(1) |
|     if( pps_palette_predjctor_initializer_present_flag ) { | |
|         pps_num_palette_predictor_initializer | ue(v) |
|         if( pps_num_palette_predictor_initializer > 0 ) { | |
|             monochrome_palette_flag | u(1) |

| | Descriptor |
|---|---|
| luma_bit_depth_entry_minus8 | ue(v) |
|   if( !monochrome_palette_flag ) | |
|     chroma_bit_depth_entry_minus8 | ue(v) |
|   numComps = monochrome_palette_flag\| \| isdualtree ? 1 : 3 | |
|   for( comp = 0; comp < numComps; comp++ ) | |
|     for( i = 0; i < pps_num_palette_predictor_initializer; i++ ) | |
|       pps_palette_predictor_initializers[ comp ][ i ] | u(v) |
|   } | |
| } | |
| } | |

With respect to an initialization process for palette predictor entries, outputs of the process may include the initialized palette predictor variables "PredictorPaletteSize" and "PredictorPaletteEntries".

The variable "numComps" may be derived as follows:

$$numComps=(ChromaArrayType==0)||isdualtree?1:3 \quad (9\text{-}8)$$

If pps_palette_predictor_initializer_present_flag is equal to 1, the following applies:
PredictorPaletteSize is set equal to pps_num_palette_predictor_initializer.
The array PredictorPaletteEntries is derived as follows:

```
for( comp = 0; comp < numComps; comp++ )
    for( i = 0; i < PredictorPaletteSize; i++ )        (9-9)
        PredictorPaletteEntries[ comp ][ i ] =
            pps_palette_predictor_initializers[ comp ][ i ]
```

Otherwise (pps_palette_predictor_initializer_present_flag is equal to 0), if sps_palette_predictor_initializer_present_flag is equal to 1, the following may apply:
PredictorPaletteSize is set equal to sps_num_palette_predictor_initializer_minus1 plus 1.
The array PredictorPaletteEntries may be derived as follows:

```
for( comp = 0; comp < numComps; comp++ )
    for( i = 0; i < PredictorPaletteSize; i++ )        (9-10)
        PredictorPaletteEntries[ comp ][ i ] =
            sps_palette_predictor_initializers[ comp ][ i ]
```

Otherwise (pps_palette_predictor_initializer_present_flag is equal to 0 and sps_palette_predictor_initializer_present_flag is equal to 0), PredictorPaletteSize is set equal to 0.

In at least one aspect, the above syntaxes are different from prior HEVC syntax by including the "isdualtree" syntax.

Figure 10:
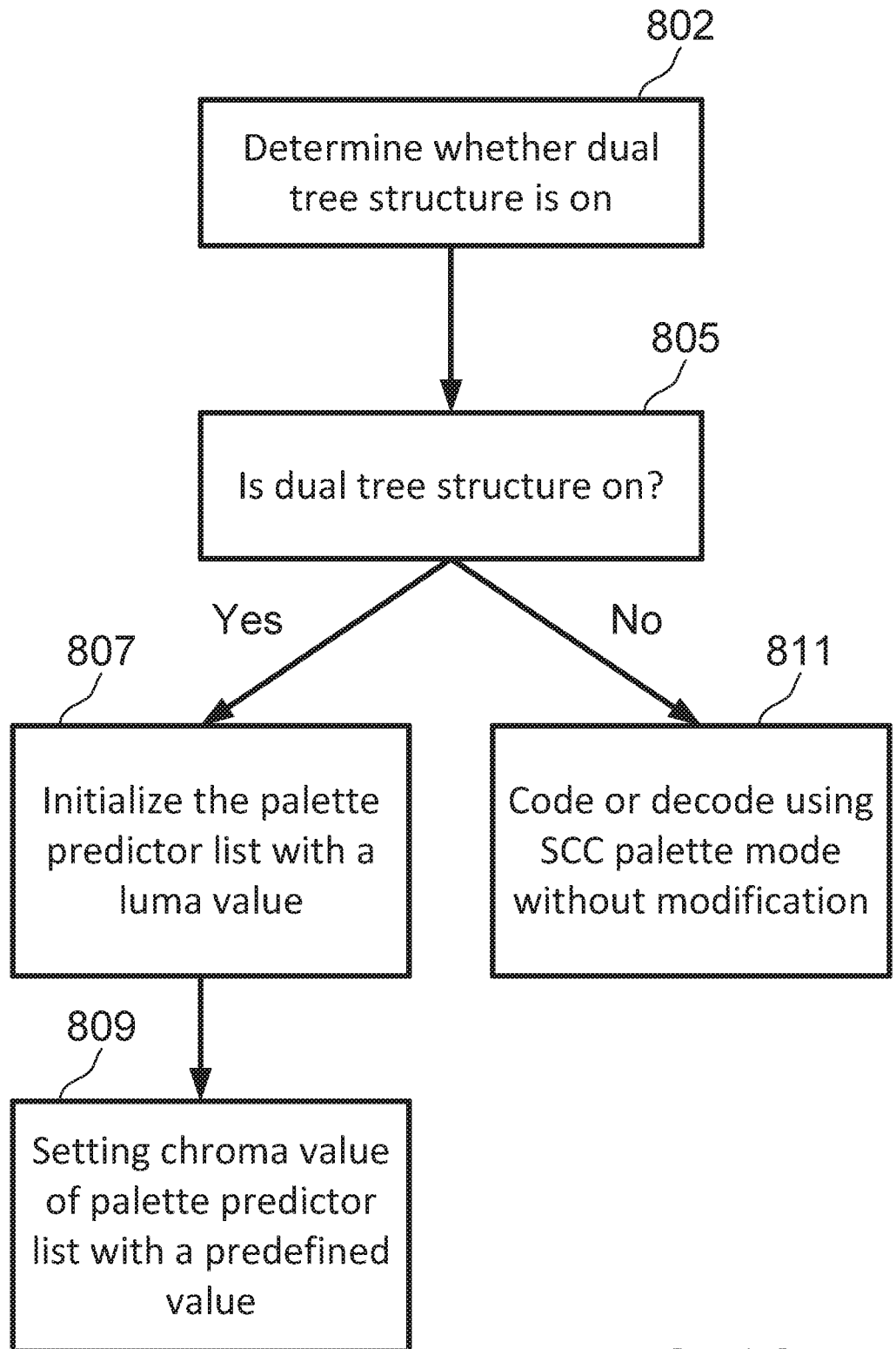
FIG. 10 is a functional block diagram of a video encoder or decoder according to an embodiment of the present disclosure.

As shown in FIG. 10, in an embodiment, an encoder or a decoder may determine whether a current tree structure is a dual tree structure where a luma color plane has a split tree structure that is different from a split tree structure of a chroma color plane (802), and then code or decode at least one image of a video sequence using one or more color palettes based on the determining whether the current tree structure is the dual tree structure, i.e. is dual tree structure "on" or "off"? (805). For example, if dual tree structure is determined to be on, the encoder or decoder may initialize the palette predictor list with a luma value signaled by palette predictor initializer (807), wherein the palette predictor list is used in the coding or decoding, and set a chroma value of the palette predictor list with a predefined value, without the palette predictor initializer signaling any chroma value to the palette predictor list (809). If dual tree structure is determined to be off, the encoder or decoder may use the SCC palette mode in coding or decoding without modification (811).

2. Modification to the Signaling of Palette Information and Palette Entries

When coding luma plane and the dual tree is on, the palette entries in the palette table may still be three component entries. However, the chroma values in the palette table may be padded with a pre-defined value, this value can be 0, 255, or any other integer. When encoding the palette entries, the palette predictor may still be used. The reuse flag may still be signaled. When the reuse flag is 1, only the luma component of the palette entries is copied. The chroma value is discarded. For the followed new palette entries, only the luma value is signaled. The chroma value is discarded. When updating the palette predictor, only the luma value is updated, and the chroma value is ignored.

When coding luma plane and the dual tree is off, the palette entries in the palette table may be three components entries, and the HEVC SCC palette signaling method may be used.

When dual tree is on and the current channel type is chroma, the palette mode flag is 0 and the current chroma block cannot be palette mode. The palette mode flag is not necessary to be signaled.

An example coding unit syntax table based on HEVC syntax is provided below, wherein the luma plane and chroma plane have the different coding tree structure.

| | Descriptor |
|---|---|
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |

-continued

| | Descriptor |
|---|---|
| ```
    else {
        if( slice_type != I )
            pred_mode_flag
        If(( palette_mode_enabled_flag && CuPredMode[ x0 ][ y0 ] = =
MODE_INTRA &&
            log2CbSize <= MaxTbLog2SizeY &&
!isdualtree)||isdualtree&&channelType==LUMA)
            palette_mode_flag[ x0 ][ y0 ]
        if( palette_mode_flag[ x0 ][ y0 ] )
            palette_coding( x0, y0, nCbS )
        else {
            if( CuPredMode[ x0 ][ y0 ] != MODE_INTRA | |
                log2CbSize = = MinCbLog2SizeY )
                part_mode
        ...}
    }
}
``` | ae(v)<br><br><br><br>ae(v)<br><br><br><br><br>ae(v) |

In an embodiment, "palette_mode_flag[x0][y0]" is inferred to be equal to 0 when dual tree is on and current plane is chroma.

In another embodiment, when dual tree is on and current plane is chroma, the "palette_mode_flag" is still signaled. But it is always 0, which indicate the palette mode is not used.

An example palette mode syntax table is provided below.

| | Descriptor |
|---|---|
| ```
palette_coding( x0, y0, nCbS ) {
    palettePredictionFinished = 0
    NumPredictedPaletteEntries = 0
    for( predictorEntryIdx = 0; predictorEntryIdx < PredictorPaletteSize &&
        !palettePredictionFinished && NumPredictedPaletteEntries <
palette_max_size;
        predictorEntryIdx++ ) {
        palette_predictor_run
        if( palette_predictor_run != 1 ) {
            if( palette_predictor_run > 1 )
                predictorEntryIdx += palette_predictor_run − 1
            PalettePredictorEntryReuseFlags[ predictorEntryIdx ] = 1
            NumPredictedPaletteEntries++
        } else
            palettePredictionFinished = 1
    }
    if( NumPredictedPaletteEntries < palette_max_size )
        num_signalled_palette_entries
    numComps = ( ChromaArrayType = = 0 | |(isdualtree && channelType =
LUMA)) ? 1 : 3
    for( cIdx = 0; cIdx < numComps; cIdx++ )
        for( i = 0; i < num_signalled_palette_entries; i++ )
            new_palette_entries[ cIdx ][ i ]
    if( CurrentPaletteSize != 0 )
        palette_escape_val_present_flag
    ...
}
``` | <br><br><br><br><br><br>ae(v)<br><br><br><br><br><br><br><br><br>ae(v)<br><br><br><br>ae(v)<br><br>ae(v) |

In an embodiment, with respect to the decoding process of generating the current palette, the variable "CurrentPaletteEntries[cIdx][i]" specifies the i-th element in the current palette for the colour component cIdx and is derived as follows:

```
numComps = ( ChromaArrayType = = 0)| |isdualtree&&channelType==LUMA) ? 1 : 3
numPredictedPaletteEntries = 0
for( i = 0; i < PredictorPaletteSize; i++ )
    if( PalettePredictorEntryReuseFlags[ i ] ) {
        for( cIdx = 0; cIdx < numComps; cIdx++ )
            CurrentPaletteEntries[ cIdx ][ numPredictedPaletteEntries ] =
```

```
PredictorPaletteEntries[ cIdx ][ i ]
        numPredictedPaletteEntries++
    }
for( cIdx = 0; cIdx < numComps; cIdx++ )                        (7-82)
    for( i = 0; i < num_signalled_palette_entries; i++ )
        CurrentPaletteEntries[ cIdx ][ numPredictedPaletteEntries + i ] =
new_palette_entries[ cIdx ][ i ]
```

In an embodiment, with respect to the update process of the palette predictor, the variable PredictorPaletteSize and the array PredictorPaletteEntries are derived or modified as follows:

```
numComps = ( ChromaArrayType = = 0)| !isdualtree&&channelType==LUMA) ? 1 : 3
for( i = 0; i < CurrentPaletteSize; i++ )
    for( cIdx = 0; cIdx < numComps; cIdx++ )
        newPredictorPaletteEntries[ cIdx ][ i ] = CurrentPaletteEntries[ cIdx ][ i ]
newPredictorPaletteSize = CurrentPaletteSize
for( i = 0; i < PredictorPaletteSize && newPredictorPaletteSize <
PaletteMaxPredictorSize; i++ )
    if( !PalettePredictorEntryReuseFlags[ i ] ) {
        for( cIdx = 0; cIdx < numComps; cIdx++ )                (8-79)
            newPredictorPaletteEntries[ cIdx ][ newPredictorPaletteSize ] =
                PredictorPaletteEntries[ cIdx ][ i ]
        newPredictorPaletteSize++
    }
for( cIdx = 0; cIdx < numComps; cIdx++ )
    for( i = 0; i < newPredictorPaletteSize; i++ )
        PredictorPaletteEntries[ cIdx ][ i ] = newPredictorPaletteEntries[ cIdx ][ i ]
PredictorPaletteSize = newPredictorPaletteSize
```

In at least one aspect, the above syntaxes are different from prior HEVC syntax by including the "||(isdualtree && channelType=LUMA)" syntax.

Figure 11:
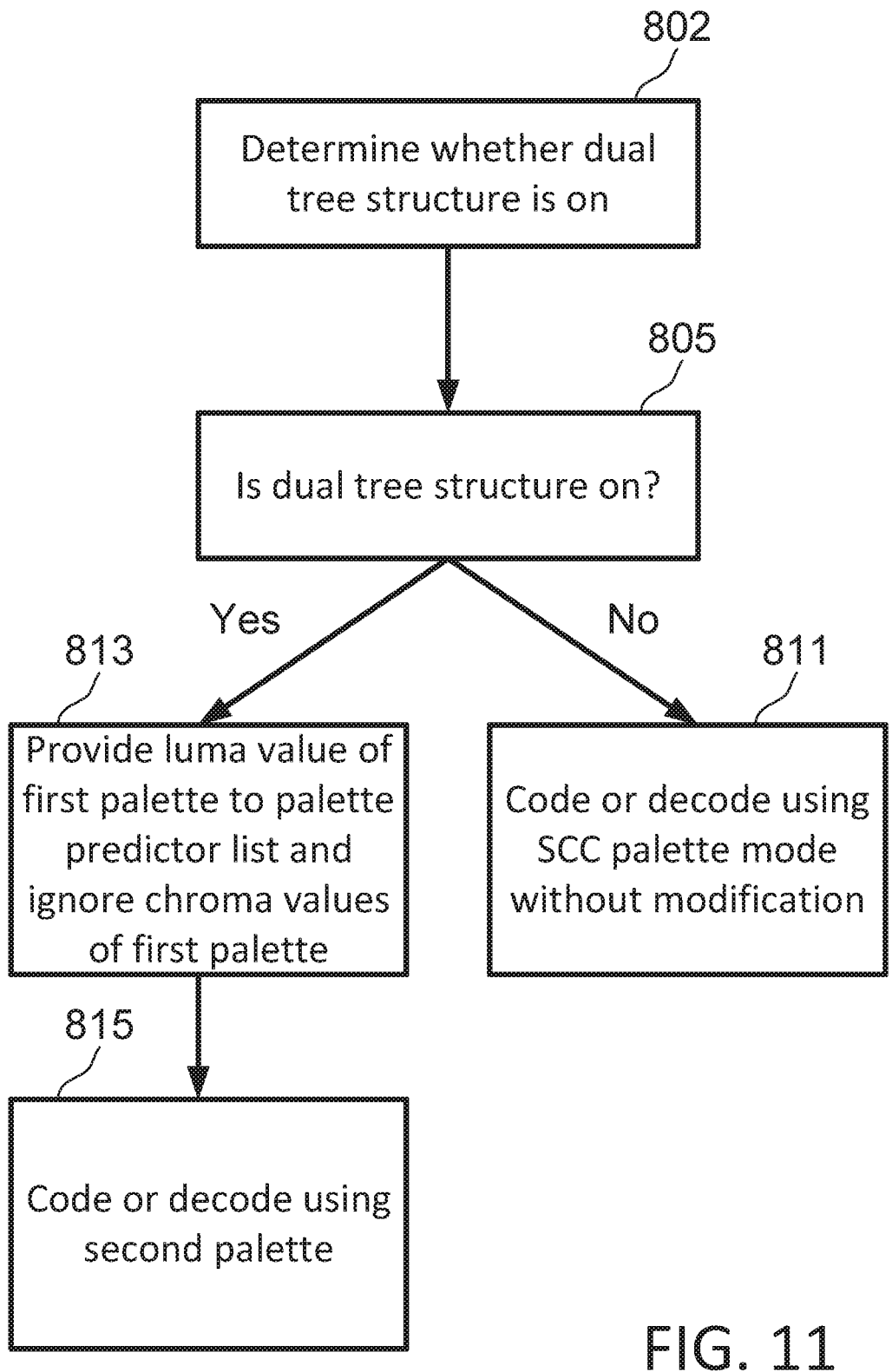
FIG. 11 is a functional block diagram of a video encoder or decoder according to an embodiment of the present disclosure.

As shown in FIG. 11, in an embodiment, an encoder or a decoder may determine whether a current tree structure is a dual tree structure where a luma color plane has a split tree structure that is different from a split tree structure of a chroma color plane (802), and then code or decode at least one image of a video sequence using one or more color palettes based on the determining whether the current tree structure is the dual tree structure, i.e. is dual tree structure "on" or "off" (805). For example, if dual tree structure is determined to be on, the encoder or decoder may provide a first luma value of a first palette to the palette predictor list and ignore all chroma values of the first palette, such that no chroma value of the first palette is provided to the palette predictor list (813), and then the encoder or decoder may code or decode an image using a second palette, which may be predicted by the encoder or decoder by using the palette predictor list (815). If dual tree structure is determined to be off, the encoder or decoder may use the SCC palette mode in coding or decoding without modification (811).

3. Modification to the Signaling of Escape Values

In an embodiment, when coding luma plane and the dual tree is on, if the pixel value is escape, only the luma value is signaled and the chroma value is discarded.

An example syntax table based on HEVC syntax is provided below, wherein the luma plane and chroma plane have a different coding tree structure.

| | Descriptor |
|---|---|
| ```
palette_coding( x0, y0, nCbS ) {
    palettePredictionFinished = 0
    NumPredictedPaletteEntries = 0
    ...
    if( palette_escape_val_present_flag ) {
        for( cIdx = 0; cIdx < numComps; cIdx++ )
            for(sPos = 0; sPos < nCbS * nCbS; sPos++ ) {
                xC = x0 + ScanOrder[ log2BlockSize ][ 3 ][ sPos ][ 0 ]
                yC = y0 + ScanOrder[ log2BlockSize ][ 3 ][ sPos ][ 1 ]
                if( PaletteIndexMap[ xC ][ yC ] = = MaxPaletteIndex )
                    If(( cIdx = = 0 | | ( xC % 2 = = 0 && yC % 2 = = 0 &&
                        ChromaArrayType = = 1 ) | | ( xC % 2 = = 0 &&
                        !palette_transpose_flag && ChromaArrayType = = 2 ) | |
                        ( yC % 2 = = 0 && palette_transpose_flag &&
                        ChromaArrayType = = 2) | | ChromaArrayType = = 3
``` | |

| | Descriptor |
|---|---|
| `                && !isdualtree)\| \| (isdualtree && cIdx = = 0 )){` | |
| `                    palette_escape_val` | ae(v) |
| `                    PaletteEscapeVal[ cIdx ][ xC ][ yC ] = palette_escape_val` | |
| `                }` | |
| `            }` | |
| `        }` | |
| `}` | |

In the above syntax tables, "isdualtree" indicates whether the current tree structure is separate tree or not. If "isdualtree" is 1, the current tree structure is separate tree. If "isdualtree" is 0, the current tree structure is not separate tree.

The variable "channelType" indicates the current color plane is luma plane or chroma plane. If "channelType" is equal to Luma, the current color plane is luma plane. If "channelType" is equal to Chroma, the current color plane is chroma plane.

Figure 12:
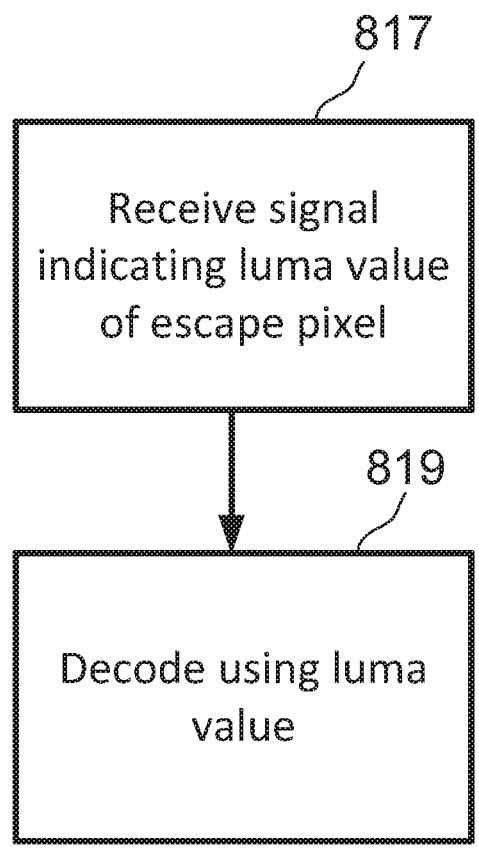
FIG. 12 is a functional block diagram of a video decoder according to an embodiment of the present disclosure.

In an embodiment, an encoder may signal a luma value of an escape pixel to a decoder, without signaling any chroma value of the escape pixel for palette mode, based on the encoder determining the dual tree structure is on. As shown in FIG. 12, in an embodiment, the decoder may thus receive a signal indicating a luma value of an escape pixel without receiving any signal indicating a chroma value of the escape pixel to be used in the palette mode (817), and then decode at least one image using the luma value of the escape pixel in the palette mode (819).

[Second Aspect]

In an embodiment, when coding the chroma plane while the isdualtree on, the chroma plane can still use the palette mode. Several embodiments may enable palette mode for chroma plane. Embodiments of the present disclosure that include the "Second Aspect" may resolve the problem of, when luma and chroma color planes are coded separately, one palette table with multiple color components not being able to be applied on the separate color planes.

Non-limiting example embodiments for enabling palette mode for chroma plane of the present disclosure are described below.

1. Signal Whether Current Chroma Block Using Palette Mode or not

In an embodiment, for each chroma block when dual tree is on, a flag is signaled to indicate whether the current block is using palette mode or not. If the current chroma block is using palette mode, the corresponding syntax element related to palette mode may also be signaled. The flag may be signaled by the encoder and received by the decoder.

Figure 13:
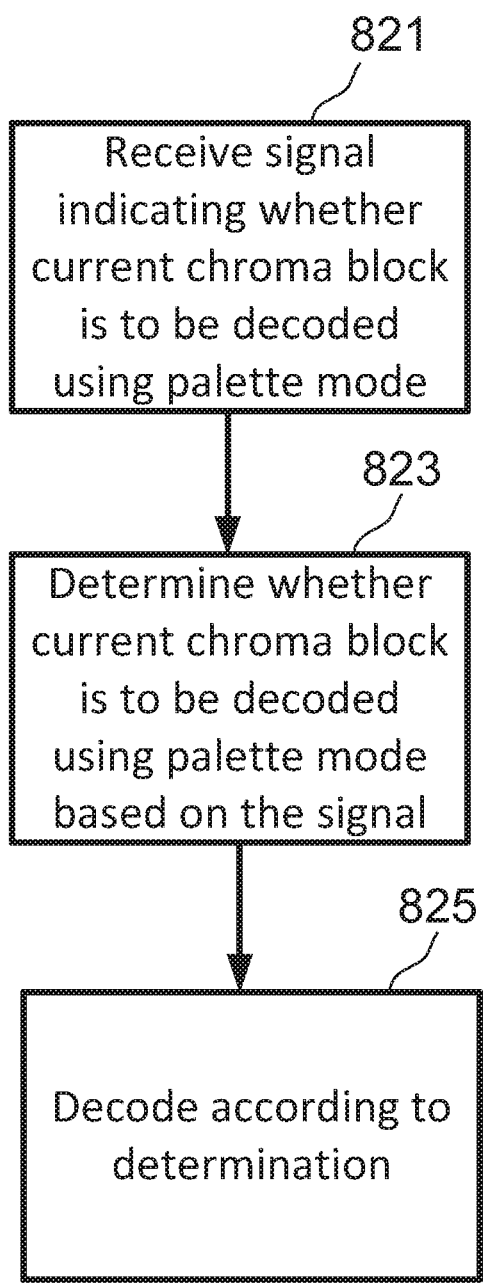
FIG. 13 is a functional block diagram of a video decoder according to an embodiment of the present disclosure.

As shown in FIG. 13, in an embodiment, the decoder may receive a signal (e.g., a flag) indicating whether a current chroma block is to be decoded using the palette mode (821), and determine whether the current chroma block is to be decoded using the palette mode based on the signal (823). Following, the decoder may decode according to the determination (825). For example, the decoder may decode the current chroma block by using a color palette in a case where the signal indicates the current chroma block is to be decoded using the palette mode.

2. When the Current Block Co-Located Luma Blocks are Palette Mode, Signal Whether Current Chroma Block Using Palette Mode or not In an embodiment, if the chroma block co-located all or partial luma blocks are palette mode, the chroma block signals whether it is using palette mode or not. If the current chroma block is using palette mode, the corresponding syntax element related to palette mode will also be signaled.

In another embodiment, if the chroma block co-located luma blocks are all palette mode, the chroma block signal whether it is using palette mode or not. If the current chroma block is using palette mode, the corresponding syntax element related to palette mode may also be signaled. If not all the co-located luma blocks are using palette mode, the current chroma block is not palette mode, and it is not necessary to signal.

In another embodiment, if the chroma block co-located luma blocks are partial palette mode, when the portion of palette mode is greater than a threshold, it is signaled whether the current chroma block is using palette mode or not. If the current chroma block is using palette mode, the corresponding syntax element related to palette mode may also be signaled. If the portion of the co-located luma blocks that are using palette mode is smaller or equal to the threshold, the current chroma block is not palette mode, and it not necessary to signal.

3. Derive the Current Chroma Block Using Palette Mode or not from the Co-Located Luma Block.

In an embodiment, if the chroma block co-located all or partial luma blocks are palette mode, the chroma block is using palette mode by default. If the current chroma block is using palette mode, the corresponding syntax element related to palette mode may also be signaled. When signaling the chroma palette information, the chroma palette table may be a two entries table and the two chroma components may share the one index map.

In an embodiment, if the chroma block co-located luma blocks are all palette mode, the chroma block is using palette mode by default. If the current chroma block is using palette mode, the corresponding syntax element related to palette mode may also be signaled. If not all the co-located luma block are using palette mode, the current chroma block is not palette mode.

In an embodiment, if the chroma block co-located luma blocks are partial palette mode, when the portion of palette mode is greater than a threshold, the chroma block is using palette mode by default. If the current chroma block is using palette mode, the corresponding syntax element related to palette mode may also be signaled. If the portion of the co-located luma block are using palette mode is smaller or equal to the threshold, the current chroma block is not palette mode.

In the above embodiments including the "Second Aspect", the maximum palette size and maximum palette predictor size of chroma block can be the same as the luma block.

In an embodiment, the maximum palette size and maximum palette predictor size of the chroma block can be different from the luma block, and the maximum palette size and maximum palette predictor size can be signaled at a sequence parameter set, picture parameter set, or slice header.

When signaling the chroma block palette mode flag, a chroma_palette_mode_flag may be signaled. It can be either bypass coded or context coded. When it is context coded, it can use 1, 2, . . . N context, wherein N is an integer greater than 0.

Figure 14:
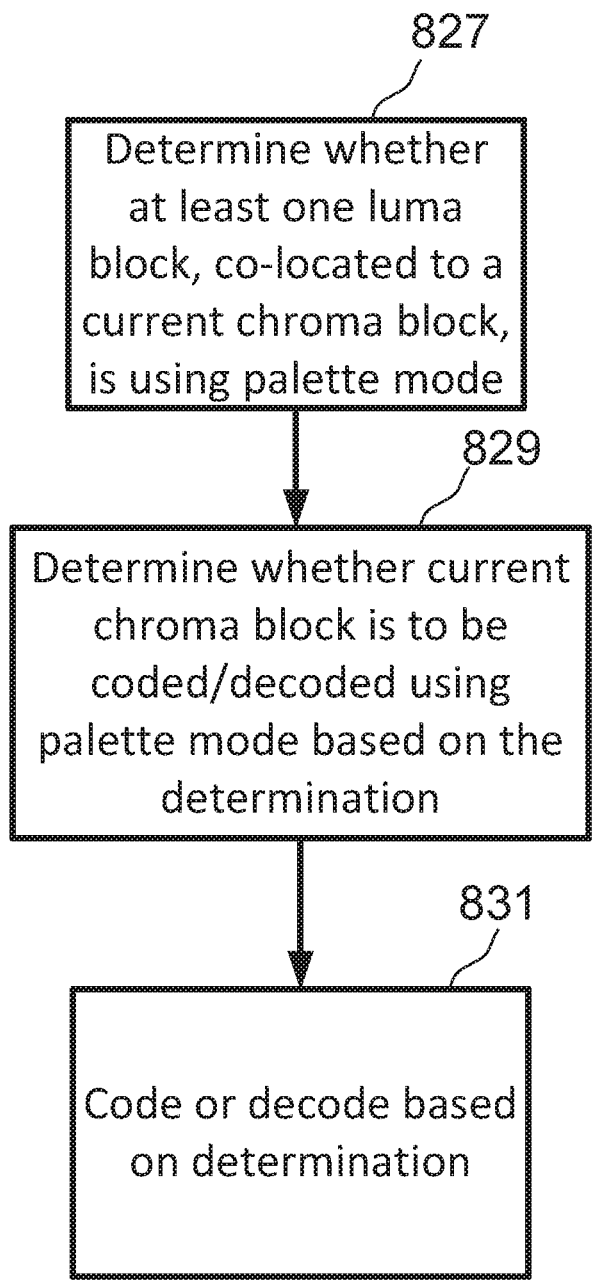
FIG. 14 is a functional block diagram of a video encoder or decoder according to an embodiment of the present disclosure.

As shown in FIG. 14, in an embodiment, an encoder or a decoder may determine whether at least one luma block, co-located to a current chroma block, is using the palette mode (827), determine whether a current chroma block is to be using the palette mode based on the determining whether the at least one luma block is using the palette mode (829), and then code or decode in accordance with the above determinations (831). For example, in the case where the current chroma block is determined to be coded or decoded using the palette mode, the current chroma block may be coded or decoded in the palette mode. The determination (829) may be in accordance with any of the above embodiments.

4. Derive the Chroma Palette Information from the Co-Located Luma Block

4a. Derive the Chroma Index Map from Luma Index Map

In an embodiment, if the chroma block co-located luma blocks are all palette mode, the chroma block index map can be derived from the luma index map. One flag can be used to indicate whether the current block is reusing the luma index map or not. In an embodiment, when the chroma block co-located luma blocks are all palette mode, the chroma block index map is derived from the luma index map without signaling.

If the current chroma block is reusing the luma index map, the chroma index map may be a down sampled index map from luma due to the different resolution of luma and chroma. When doing the down sampling for 4:2:0 format, there are many possible positions as, for example, illustrated in FIG. 15.

Figure 15:
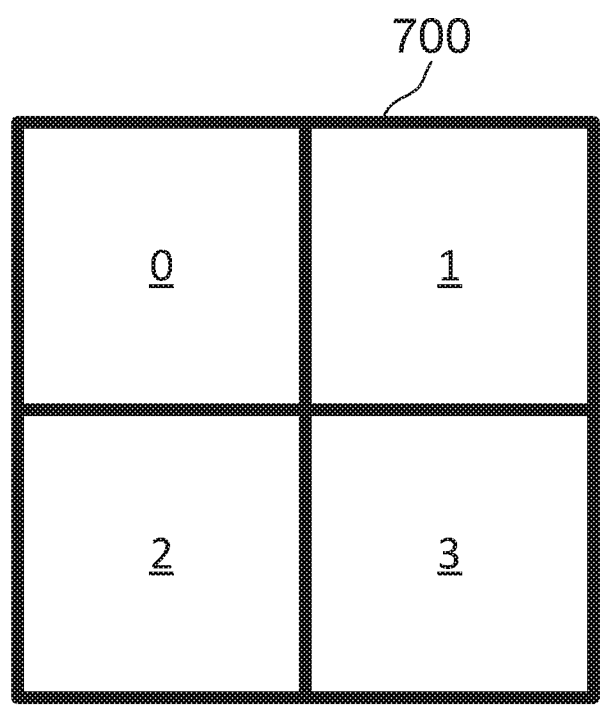
FIG. 15 is a diagram illustrating an example of a luma index map.

The chroma index can come from positions 0, 1, 2, 3 of a luma index map 700, as illustrated in FIG. 15. This can be predefined or signaled at SPS, PPS, or slice header.

If the current chroma block is not reusing the luma index map, the chroma may signal the palette index information, such as run type, and run length.

In an embodiment, if the chroma block co-located luma blocks are partial palette mode, when the portion of palette mode is greater than a threshold, the chroma block can derive the index map from the luma block. The derivation process may be similar to the derivation processes of the above example embodiments. In another embodiment, when the portion of palette mode is greater than a threshold, a flag is signaled to indicate whether the chroma block index map is derived from the luma index map.

4b. Derive the Chroma Palette Predictor Reuse Flag from Luma Palette Predictor Reuse Flag In an embodiment, if the chroma block co-located luma blocks are all palette mode, the chroma block palette predictor reuse flag can be derived from the luma palette predictor reuse flag. One flag can be used to indicate whether the current block is reusing the luma palette predictor reuse flag or not. In an embodiment, when the chroma block co-located luma blocks are all palette mode, the chroma block palette predictor reuse flag is derived from the luma palette predictor reuse flag without signaling.

In an embodiment, if the chroma block co-located luma blocks are partial palette mode, when the portion of palette mode is greater than a threshold, the chroma block can derive the palette predictor reuse flag from the luma block. In another embodiment, when the portion of palette mode is greater than a threshold, a flag is signaled to indicate whether the chroma block palette predictor reuse flag is derived from the luma palette predictor reuse flag.

[Third Aspect]

In an example method, if the input video is 3 color components video, such as Y, Cb, and Cr, 3 set separate palette mode coding may be used for each component. For example, there may be a respective palette table for each color component, and a respective palette index map for each color component. The predictive signaling for the palette tables and palette index maps can be used in each color component. The palette predictor initializer may also have a three set.

1. Modification to the Palette Predictor Initialization when the Three Components are Separate Coded In an embodiment, the three components share the same "sps_palette_predictor_initializer_present_flag" or "pps_palette_predictor_initializer_present_flag", and when this flag is "1", the palette predictor initializer syntax elements following are signaled.

In an embodiment, the three components have their own "sps_palette_predictor_initializer_present_flag" or "pps_palette_predictor_initializer_present_flag". When these flags for each component is "1", the palette predictor initializer syntax for the corresponding color components following are signaled.

In an embodiment, the three components can share the same maximum palette size, which may be signaled by "palette_max_size" syntax, and the same maximum palette predictor size, which may be signaled by "delta_palette_max_predictor_size" syntax. In another embodiment, the three components have their own maximum palette size and maximum palette predictor size.

In an embodiment, the three components have the same number of palette predictor initializers. In this case, the HEVC SCC syntax palette initializer part does not need to change anything.

In an embodiment, the three components have their own numbers of palette predictor initializers that can be signaled at SPS or PPS. Example SPS and PPS syntax tables based on HEVC syntax are provided below, wherein the three components are coded separately. In this example, the three components share the same "sps_palette_predictor_initializer_present_flag" or "pps_palette_predictor_initializer_present_flag".

SPS Syntax

|  | Descriptor |
| --- | --- |
| sps_scc_extension( ) { |  |
|     sps_curr_pic_ref_enabled_flag | u(1) |
|     palette_mode_enabled_flag | u(1) |
|     if( palette_mode_enabled_flag ) { |  |
|         palette_max_size | ue(v) |
|         delta_palette_max_predictor_size | ue(v) |

-continued

| | Descriptor |
|---|---|
| sps_palette_predictor_initializer_present_flag | u(1) |
| if( sps_palette_predictor_initializer_present_flag ) { | |
|     numComps = (chroma_format_idc = = 0) ? 1 : 3 | |
|     for( comp = 0; comp < numComps; comp++ ) { | |
|         sps_num_palette_predictor_initializer_minus1[ comp ] | ue(v) |
|         for( i = 0; i <= sps_num_palette_predictor_initializer_minus1[ comp ]; i++ ) | |
|             sps_palette_predictor_initializers[ comp ][ i ] | u(v) |
|     } | |
| } | |
| motion_vector_resolution_control_idc | u(2) |
| intra_boundary_filtering_disabled_flag | u(1) |
| } | |

PPS Syntax

| | Descriptor |
|---|---|
| pps_scc_extension( ) { | |
|   pps_curr_pic_ref_enabled_flag | u(1) |
|   residual_adaptive_colour_transform_enabled_flag | u(1) |
|   if( residual_adaptive_colour_transform_enabled_flag ) { | |
|     pps_slice_act_qp_offsets_present_flag | u(1) |
|     pps_act_y_qp_offset_plus5 | se(v) |
|     pps_act_cb_qp_offset_plus5 | se(v) |
|     pps_act_cr_qp_offset_plus3 | se(v) |
|   } | |
|   pps_palette_predictor_initializer_present_flag | u(1) |
|   if( pps_palette_predictor_initializer_present_flag ) { | |
|     if( pps_num_palette_predictor_initializer > 0 ) { | |
|       monochrome_palette_flag | u(1) |
|       luma_bit_depth_entry_minus8 | ue(v) |
|       if( !monochrome_palette_flag ) | |
|         chroma_bit_depth_entry_minus8 | ue(v) |
|       numComps = monochrome_palette_flag? 1 : 3 | |
|       for( comp = 0; comp < numComps; comp++ ) { | |
|         pps_num_palette_predictor_initializer[ comp ] | ue(v) |
|         for( i = 0; i < pps_num_palette_predictor_initializer[ comp ]; i++ ) | |
|           pps_palette_predictor_initializers[ comp ][ i ] | u(v) |
|       } | |
|     } | |
|   } | |
| } | |

With respect to an initialization process for palette predictor entries, outputs of the process may be the initialized palette predictor variables PredictorPaletteSize and PredictorPaletteEntries.

The variable numComps may be derived as follows:

numComps=(ChromaArrayType==0)?1:3    (9-8)

If pps_palette_predictor_initializer_present_flag is equal to 1, the following applies:
PredictorPaletteSize [comp] is set equal to pps_num_palette_predictorinitializer[comp].
The array PredictorPaletteEntries is derived as follows:

```
for( comp = 0; comp < numComps; comp++ )
    for( i = 0; i < PredictorPaletteSize[ comp ]; i++ )       (9-9)
        PredictorPaletteEntries[ comp ][ i ] =
            pps_palette_predictor_initializers[ comp ][ i ]
```

Otherwise (pps_palette_predictor_initializer_present_flag is equal to 0), if sps_palette_predictor_initializer_present_flag is equal to 1, the following applies:
PredictorPaletteSize[comp] is set equal to sps_num_palette_predictor_initializer_minus1 plus 1[comp].

The array PredictorPaletteEntries is derived as follows:

```
for( comp = 0; comp < numComps; comp++ )
    for( i = 0; i < PredictorPaletteSize[ comp ]; i++ )       (9-10)
        PredictorPaletteEntries[ comp ][ i ] =
            sps_palette_predictor_initializers[ comp ][ i ]
```

Otherwise (pps_palette_predictor_initializer_present_flag is equal to 0 and sps_palette_predictor_initializer_present_flag is equal to 0), PredictorPaletteSize[comp] is set equal to 0.

In the above process, "comp" specifies the color components, the value can be 0, 1, 2 to indicate which color component is used.

In at least one aspect, the above syntaxes are different from prior HEVC syntax by, for example, including the following syntaxes:

(1)

```
for( comp = 0; comp < numComps; comp++ ) {
    sps_num_palette_predictor_initializer_minus1[ comp ]
```

-continued

```
for( i = 0; i <= sps_num_palette_predictor_initialize_minus1[ comp ];
i++)
    sps_palette_predictor_initializers[ comp ][ i ]
}
```

(2)

```
for( comp = 0; comp < numComps; comp++ ) {
    pps_num_palette_predictor_initializer[ comp ]              ue(v)
    for( i = 0; i < pps_num_palette_predictor_initializer[ comp ];
i++ )
        pps_palette_predictor_initializers[ comp ][ i ]        u(v)
}
```

(3) "[comp]"

2. Modification to the Signaling of Palette Information and Palette Entries

When coding the three components separately with palette mode. In an embodiment, all the three components share one "palette_mode_flag". If the "palette_mode_flag" is true, palette mode for all the three components are used.

In an embodiment, each of the component has its own "palette_mode_flag". This flag indicates whether the palette mode is used for the corresponding color component of the current block.

In an embodiment, two of the three components share one "palette_mode_flag", and the other has its own palette mode flag. In one embodiment, Cb and Cr share one palette mode flag.

In an embodiment, the above three embodiments can be used together when there are different configurations. In an embodiment, when there is separate luma and chroma plane coding, luma can have its own "palette_mode_flag". Cb and Cr can have their own palette_mode_flags. When luma plane and chroma plane have the same partition, Y, Cb and Cr can share one "palette_mode_flag".

When the "palette_mode_flag" is true. The corresponding palette syntax information may be signaled for each color component. Example syntax tables based on HEVC syntax are provided below, wherein the three color components palette mode are signaled separately. This syntax table also includes the separate tree structure. In the example, a variable "treeType" specified whether a single or a dual tree is used and if a dual tree is used, the variable specifies whether the current tree corresponds to the luma or chroma components. In the below syntax tables and decoding processes, "ComBegin" specifies the color components, wherein the value can be 0, 1, 2 to indicate which color component is used. The syntax names provided below are only examples, and can be any other names that makes sense.

Coding Unit Syntax

|  | Descriptor |
|---|---|
| coding_unit( x0, y0, log2CbSize ) { | |
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ]) | |
|     prediction_unit( x0, y0, nCbS, nCbS ) | |
|   else { | |
|     if( slice_type != I ) | |
|       pred_mode_flag | |
|     if( palette_mode_enabled_flag && CuPredMode[ x0 ][ y0 ] = = MODE_INTRA && | ae(v) |
|       log2CbSize <= MaxTbLog2SizeY ) | |
|       palette_mode_flag[ x0 ][ y0 ] | ae(v) |
|     if( palette_mode_flag[ x0 ][ y0 ]) | |
|       if( treeType = = SINGLE_TREE \|\| treeType = = DUAL_TREE_LUMA ) | |
|     { | |
|       palette_coding( x0, y0, nCbS, 0) | |
|     } | |
|     if( treeType = = SINGLE_TREE \|\| treeType = = DUAL_TREE_CHROMA ) { | |
|       palette_coding( x0, y0, nCbS, 1 ) | |
|       palette_coding( x0, y0, nCbS, 2) | |
|     } | |
|     else { | |
|       ... | |
|     } | |

Palette Mode Syntax

|  | Descriptor |
|---|---|
| palette_coding( x0, y0, nCbS, ComBegin ) { | |
|   palettePredictionFinished = 0 | |
|   NumPredictedPaletteEntries = 0 | |
|   for( predictorEntryIdx = 0; predictorEntryIdx < PredictorPaletteSize[ComBegin] && !palettePredictionFinished && NumPredictedPaletteEntries < palette_max_size; | |
|     predictorEntryIdx++ ) { | |
|     palette_predictor_run | ae(v) |

|  | Descriptor |
|---|---|
| ```
        if( palette_predictor_run != 1 ) {
            if( palette_predictor_run > 1)
                predictorEntryIdx += palette_predictor_run − 1
            PalettePredictorEntryReuseFlags[ComBegin][ predictorEntryIdx ] = 1
            NumPredictedPaletteEntries++
        } else
            palettePredictionFinished = 1
    }
    if( NumPredictedPaletteEntries < palette_max_size )
        num_signalled_palette_entries
        for( i = 0; i < num_signalled_palette_entries; i++ )
            new_palette_entries[ ComBegin ][ i ]
    if( CurrentPaletteSize != 0 )
        palette_escape_val_present_flag
    if( MaxPaletteIndex > 0) {
        num_palette_indices_minus1
        adjust = 0
        for( i = 0; i <= num_palette_indices_minus1; i++ ) {
            if( MaxPaletteIndex − adjust > 0 ) {
                palette_index_idc
                PaletteIndexIdc[ i ] = palette_index_idc
            }
            adjust = 1
        }
        copy_above_indices_for_final_run_flag
        palette_transpose_flag
    }
    if( palette_escape_val_present_flag&& treeType = = SINGLE_TREE | |
treeType = = DUAL_TREE_LUMA ) {
        delta_qp( )
        if ( !cu_transquant_bypass_flag && treeType = = SINGLE_TREE | |
treeType = = DUAL_TREE_CHROMA)
            chroma_qp_offset( )
    }
    remainingNumIndices = num_palette_indices_minus1 + 1
    PaletteScanPos = 0
    log2BlockSize = Log2( nCbS )
    while( PaletteScanPos < nCbS * nCbS ) {
        xC = x0 + ScanOrder[ log2BlockSize ][ ComBegin ][ PaletteScanPos ][ 0 ]
        yC = y0 + ScanOrder[ log2BlockSize ][ ComBegin][ PaletteScanPos ][ 1 ]
        if( PaletteScanPos > 0) {
            xcPrev = x0 +
ScanOrder[ log2BlockSize ][ ComBegin ][ PaletteScanPos − 1 ][ 0 ]
            ycPrev = y0 + ScanOrder[ log2BlockSize ][ ComBegin][ PaletteScanPos
−1 ][ 1 ]
        }
        PaletteRun = nCbS * nCbS − PaletteScanPos − 1
        CopyAboveIndicesFlag[ xC ][ yC ] = 0
        if( MaxPaletteIndex > 0 )
            if( PaletteScanPos >= nCbS &&
CopyAboveIndicesFlag[ xcPrev ][ ycPrev ] = = 0 )
                if( remainingNumIndices > 0 && PaletteScanPos < nCbS * nCbS − 1
) {
                    copy_above_palette_indices_flag
                    CopyAboveIndicesFlag[ xC ][ yC ] =
copy_above_palette_indices_flag
                } else
                    if( PaletteScanPos = = nCbS * nCbS − 1 &&
remainingNumIndices > 0)
                        CopyAboveIndicesFlag[ xC ][ yC ] = 0
                    else
                        CopyAboveIndicesFlag[ xC ][ yC ] = 1
        if( CopyAboveIndicesFlag[ xC ][ yC ] = = 0) {
            currNumIndices = num_palette_indices_minus1 + 1 −
remainingNumIndices
            CurrPaletteIndex = PaletteIndexIdc[ currNumIndices ]
        }
        if( MaxPaletteIndex > 0 ) {
            if ( CopyAboveIndicesFlag[ xC ][ yC ] = = 0 )
                remainingNumIndices − = 1
            PaletteMaxRun = nCbS * nCbS − PaletteScanPos − 1 −
remainingNumIndices −
                copy_above_indices_for_final_run_flag
            if( remainingNumIndices > 0 | | CopyAboveIndicesFlag[ xC ][ yC ] !=
                copy_above_indices_for_final_run_flag )
                if( PaletteMaxRun > 0 ) {
                    palette_run_prefix
``` | ae(v)<br><br><br><br><br><br>ae(v)<br><br>ae(v)<br><br>ae(v)<br><br><br><br><br>ae(v)<br><br><br><br>ae(v)<br>ae(v)<br><br><br><br><br><br><br><br><br><br><br><br><br><br><br><br><br><br><br><br><br><br><br><br><br>ae(v)<br><br><br><br><br><br><br><br><br><br><br><br><br><br><br><br><br>ae(v) |

| | Descriptor |
|---|---|
| ``` 
            if( ( palette_run_prefix > 1 ) && ( PaletteMaxRun !=
                ( 1 << (palette_run_prefix − 1 ) ) ) )
                palette_run_suffix
        }
    }
    runPos = 0
    while ( runPos <= PaletteRun ) {
        xR = x0 + ScanOrder[ log2BlockSize ][
ComBegin][ PaletteScanPos ][ 0 ]
        yR = y0 + ScanOrder[ log2BlockSize ][
ComBegin][ PaletteScanPos ][ 1 ]
        if( CopyAboveIndicesFlag[ xC ][ yC ] = = 0 ) {
            CopyAboveIndicesFlag[ xR ][ yR ] = 0
            PaletteIndexMap[ComBegin] [ xR ][ yR ] = CurrPaletteIndex
        } else {
            CopyAboveIndicesFlag[ xR ][ yR ] = 1
            PaletteIndexMap[ComBegin] [ xR ][ yR ] =
PaletteIndexMap[ xR ][ yR − 1 ]
        }
        runPos++
        PaletteScanPos++
    }
}
if( palette_escape_val_present_flag ) {
    for(sPos = 0; sPos < nCbS * nCbS; sPos++ ) {
        xC = x0 + ScanOrder[ log2BlockSize ][ ComBegin][ sPos ][ 0 ]
        yC = y0 + ScanOrder[ log2BlockSize ][ ComBegin][ sPos ][ 1 ]
        if( PaletteIndexMap[ xC ][ yC ] = = MaxPaletteIndex )
            palette_escape_val
            PaletteEscapeVal[ComBegin][ xC ][ yC ] = palette_escape_val
        }
    }
}
``` | ae(v)<br><br><br><br><br><br><br><br><br><br><br><br><br><br><br><br><br><br><br><br><br><br><br>ae(v) |

The decoding process of generating the current palette may be as follows:

The variable CurrentPaletteEntries[ComBegin][i] specifies the i-th element in the current palette for the colour component specified by ComBegin and is derived as follows:

```
numPredictedPaletteEntries = 0
for( i = 0; i < PredictorPaletteSize[ComBegin]; i++ )
    if( PalettePredictorEntryReuseFlags[ i ] ) {
        CurrentPaletteEntries[ ComBegin][ numPredictedPaletteEntries ] =
            PredictorPaletteEntries[ ComBegin][ i ]
        numPredictedPaletteEntries++
    }
for( i = 0; i < num_signalled_palette_entries; i++ )
    CurrentPaletteEntries[ComBegin][ numPredictedPaletteEntries + i ] =
        new_palette_entries[ComBegin][ i ]
```

The update process of the palette predictor:

The variable PredictorPaletteSize and the array PredictorPaletteEntries are derived or modified as follows:

```
for( i = 0; i < CurrentPaletteSize; i++ )
    newPredictorPaletteEntries[ComBegin][ i ] = CurrentPaletteEntries[ComBegin][ i ]
newPredictorPaletteSize[ComBegin] = CurrentPaletteSize[ComBegin]
for( i = 0; i < PredictorPaletteSize[ComBegin] && newPredictorPaletteSize[ComBegin]
        < PaletteMaxPredictorSize; i++ )
    if( !PalettePredictorEntryReuseFlags[ComBegin] [ i ] ) {
        newPredictorPaletteEntries[ ComBegin][ newPredictorPaletteSize[ComBegin] ]
            =
            PredictorPaletteEntries[ ComBegin][ i ]
        newPredictorPaletteSize[ ComBegin]++
    }
    for( i = 0; i < newPredictorPaletteSize[ ComBegin]; i++ )
        PredictorPaletteEntries[ ComBegin][ i ] =
            newPredictorPaletteEntries[ ComBegin][ i ]
    PredictorPaletteSize[ComBegin] = newPredictorPaletteSize[ComBegin]
```

In at least one aspect, the above syntaxes are different from prior HEVC syntax by, for example, including the following syntaxes:

(1)

```
if( treeType = = SINGLE_TREE | | treeType = = DUAL_TREE_LUMA ) {
    palette_coding( x0, y0, nCbS, 0)
    }
if( treeType = = SINGLE_TREE | | treeType = = DUAL_TREE_CHROMA ) {
    palette_coding( x0, y0, nCbS, 1 )
    palette_coding( x0, y0, nCbS, 2)
    }
```

(2) "ComBegin"
(3) "&& treeType==SINGLE_TREE||treeType==DUAL_TREE_LUMA"
(4) "&& treeType==SINGLE_TREE||treeType==DUAL_TREE_CHROMA"

[Fourth Aspect]

In the Fourth Aspect, embodiments of the present disclosure may predict palette syntax elements of one color component from collocated other color component palette syntax elements.

1. Derive the Chroma Cr Index Map from Cb Index Map

In an embodiment, the chroma Cr block index map can be derived from the chroma Cb index map.

One flag can be used to indicate whether the current Cr block is reusing the Cb index map or not. If the current chroma Cr block is reusing the Cb index map, the chroma Cr does not need to signal the palette syntax elements.

If the current chroma Cr block is not resuing the Cb index map, the chroma Cr may signal the palette index information, such as run type, and run length.

In an embodiment, the chroma Cr block index map each entry can be derived from the chroma Cb index map.

Figure 16:
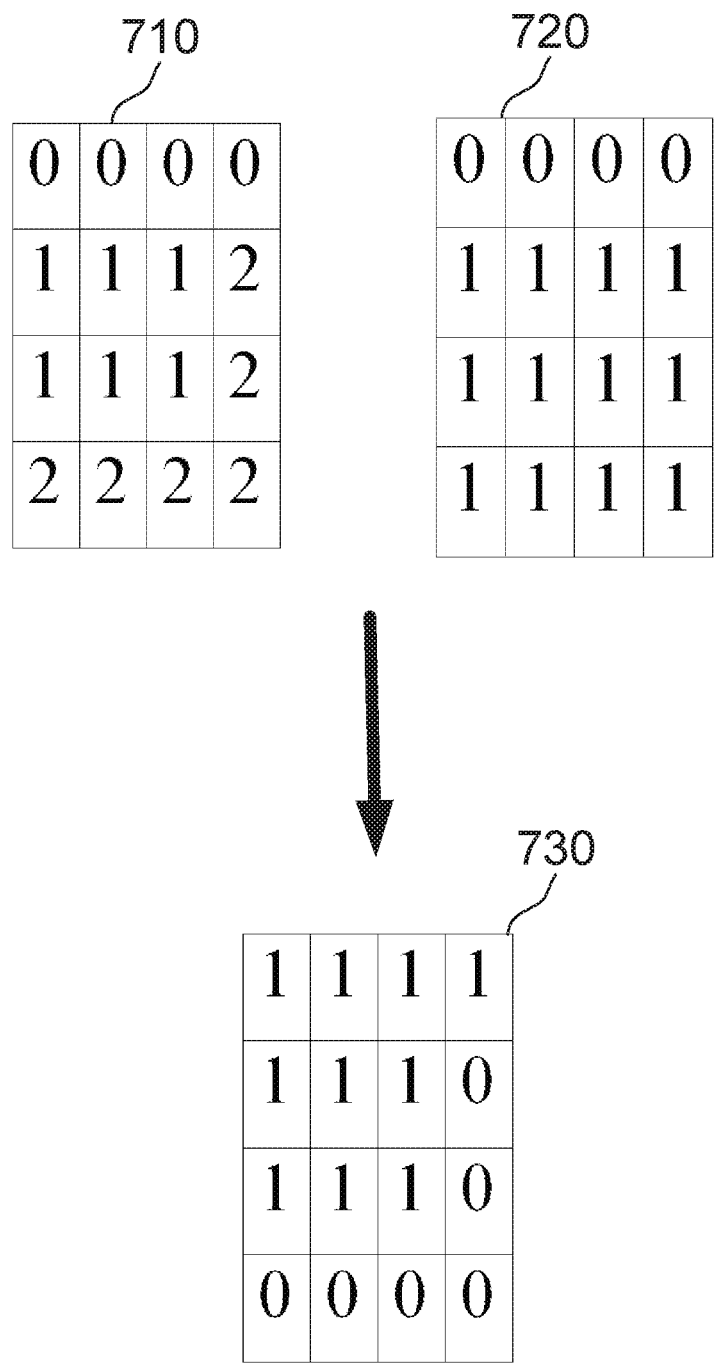
FIG. 16 is a diagram illustrating a generation process of an index reuse map of an embodiment.

Like the palette predictive signaling by the palette predictor, the index map can also use the reuse flag based predictive coding. If the Cr index map index is the same to the collocated index in Cb, the index map reuse flag is set to 1, otherwise, it is set to 0. Then an index reuse map is generated. A run length-based coding for the index map reuse flag is used to signal the index map reuse flag. As shown in FIG. 16, an index reuse map 730 for predictive coding may be generated from a Cb index map 710 and a Cr index map 720 that are compared. As shown in FIG. 16, the reuse index map 730 table may be generated by comparing each index in Cr index map 710 and Cb index map 720. Then the reuse index map 730 may be signaled by run length coding.

2. Derive the Chroma Cr Palette Predictor Reuse Flag from Chroma Cb Palette Predictor Reuse Flag In one embodiment, the chroma Cr block palette predictor reuse flag can be derived from the Cb palette predictor reuse flag. One flag can be used to indicate whether the current Cr block is reusing the Cb palette predictor reuse flag or not.

In at least one embodiment of the present disclosure, not only Cr can be predicted from Cb, but also Cr and Cb can be predicted from luma. When Cr and Cb are predicted from luma, there might be some modifications. For example, when predicting the index map, the downsampling may be needed for Cb and Cr.

[Fifth Aspect]: Generate the Combined Palette Predictor List with the Spatial Neighbor of Current Block and the HEVC Palette Predictor List]

In the Fifth Aspect, embodiments of the present disclosure may generate the combined palette predictor list with the spatial neighbor of a current block and the HEVC palette predictor list.

In comparative examples, when generating a palette predictor list, the last coded palette table has a chance that it is not from the spatial neighbor of current block. Also, there is a possibility that some neighboring blocks have higher correlation with the current block, which are not used in generating the palette predictor list. Embodiments of the present disclosure that include the "Fifth Aspect" may solve this problem by utilizing a spatial neighboring palette table to generate the palette predictor list.

A new palette predictor list may be generated when encoding (or decoding) the palette entry for the current palette table. The new palette predictor list may combine spatial neighboring blocks' palette table with the HPPL. The spatial neighboring blocks' palette table may generate a palette predictor list called SPPL. The SPPL and HPPL may generate a combined palette predictor list of current block.

Figure 17:
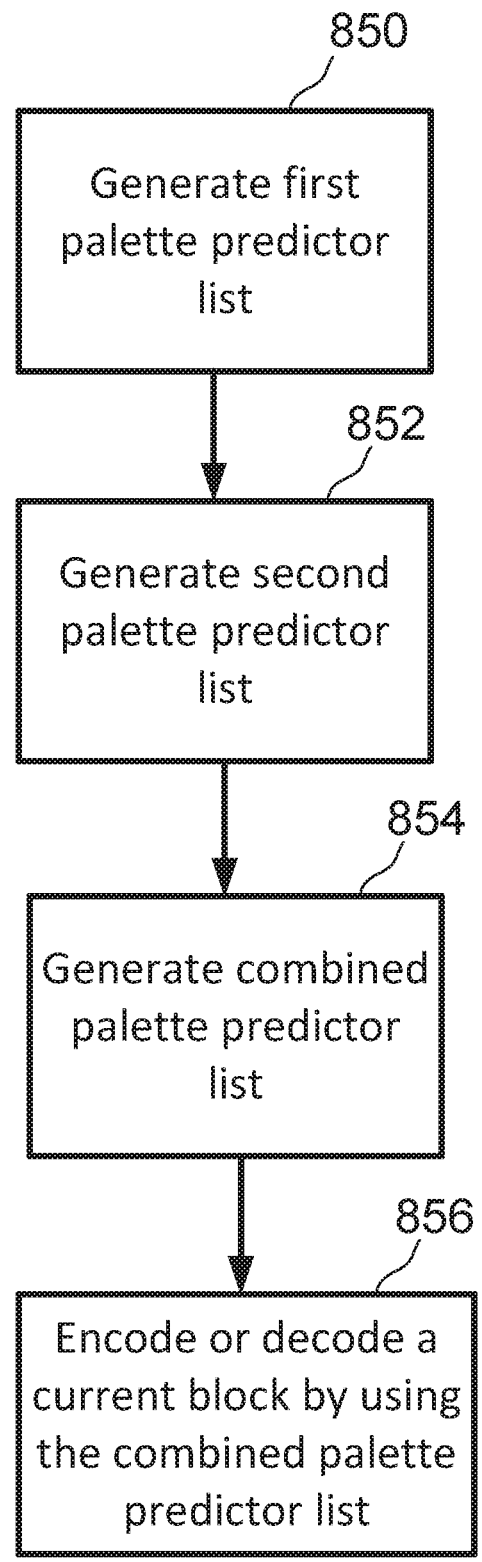
FIG. 17 is a functional block diagram of a video encoder or decoder according to an embodiment of the present disclosure.

For example, as illustrated in FIG. 17, an encoder or a decoder may generate a first palette predictor list (850). The generating may include determining whether at least one neighboring block of a current block is in the palette mode; and inserting at least one palette entry from a neighboring block of the at least one neighboring block into the first palette predictor list, based on the neighboring block being determined to be in palette mode. The encoder or decoder may also generate a second palette predictor list of the current block (852), and generate a combined palette predictor list by combining at least one palette entry of the first palette predictor list with at least one palette entry of the second palette predictor list (854). Following, the encoder or decoder may encode or decode the current block by using the combined palette predictor list (856). For example, the encoder or decoder may predict a color palette using the combined palette predictor list.

[1. Generate SPPL]

It is proposed to utilize the virtual block concept in CE4, which is also described in FIG. 7, when generating the SPPL.

For example, there may be a total of N rounds of checking neighboring blocks 520 and 530 of a current block 510. N can be start from 0 to any integer, such as 0, 1, 2, . . . . When N is 0, the adjacent neighboring blocks 520 may be checked. When N is greater than 0, both adjacent neighboring blocks 520 and non-adjacent neighboring blocks 530 may be checked.

In an embodiment, for each round i, the five neighbors (A, B, C, D, E) will all be checked if it is palette mode. If it is palette mode, the palette entry may be pruned and then inserted into the SPPL. There can be many orders when checking the five neighbors. In one embodiment, the order can be B->A->D->C->E. In an embodiment, the order can be A->D->B->C->E. In an embodiment, the order can be B->C->A->D->E. In an embodiment, the order can be combined with the block shape, for example, for the longer side, the encoder or decoder can check the neighboring blocks in the longer side first. Then, the encoder or decoder can check the neighboring blocks in the short side.

In an embodiment, for each round i, not all the five candidates are checked. In an embodiment, only the top candidate and the left candidate are checked, namely A and B. The order can also be B->A, or A->B. In an embodiment, only the top right candidate is checked (E). In an embodiment, only the above right and the left bottom candidates are checked (C, D).

In an embodiment, for each round "i", additional middle candidates between E and B (called F) or E and A (called G) are checked as well. For example, reference blocks 552 and 554 of FIG. 8 may be checked. In an embodiment, both F and G are checked. The order can be put in the any position of the five candidates. In an embodiment, one of F and G are checked. In an embodiment, the middle candidate in the long side of the current block is checked.

2. Combine SPPL and HPPL

In an embodiment, when combining the two lists, the total palette predictor list can remain the same, which may be constrained by the maximum palette predictor size. The SPPL can be inserted first, and if the palette predictor list size is does not exceed the maximum palette predictor list size, the palette entry in the HPPL may be inserted into the palette predictor list. In an embodiment, the HPPL is inserted first, and capped by a maximum HPPL size, which can be predefined or signaled. Then, the SPPL is inserted into the list.

In an embodiment, there may be a maximum combined predictor list size (MCPLS) which can be signaled at SPS, PPS, or slice header. In an embodiment, the SPPL is inserted first, and if the palette predictor list size is smaller than MCPLS, the HPPL is inserted until the palette predictor list size is equal to MCPLS. In an embodiment, the HPPL is inserted first, and if the palette predictor list size is smaller than MCPLS, the SPPL is inserted until the palette predictor list size is equal to MCPLS.

3. Pruning Method when Generate SPPL and Combine SPPL and HPPL

In an embodiment, when inserting the new palette entry into the list, lossy pruning can be used by the encoder or decoder. When using lossy pruning, the method that selects a major color can be used. When comparing the new palette entry with the palette entry in the predictor list, the error threshold can be associated with a quantization parameter (QP). Different QP have different error threshold. If the difference of the palette entry is smaller than the error threshold, the palette entry is not inserted. In an embodiment, when inserting the new palette entry into the list, lossless pruning can be used.

In an embodiment, the encoder or decoder may perform pruning by, for example, determining whether a difference between a color of at least one palette entry of a neighboring block and a color of a palette entry already provided in the first palette predictor list is larger than a predetermined threshold, and inserting the at least one palette entry from the neighboring block into the first palette predictor list based on the neighboring block being determined to be in palette mode and the difference between the color of the at least one palette entry and the color of the palette entry already provided in the first palette predictor list being determined to be larger than the predetermined threshold.

In an embodiment, the encoder or decoder may perform pruning by, for example, generating the combined palette predictor list by determining whether a difference between one of a color of an entry of the at least one palette entry of the first palette predictor list and a color of an entry of the at least one palette entry of the second palette predictor list, and a color of a palette entry already provided in the combined palette predictor list is larger than a predetermined threshold. The pruning may then be performed by inserting the entry of the at least one palette entry of the first palette predictor list or the entry of the at least one palette entry of the second palette predictor list that is used in the determining the difference, into the combined palette predictor list, based on determining that the difference between the one of the color of the entry of the first palette predictor list and the color of the entry of the second palette predictor list, and the color of the palette entry already provided in the combined palette predictor list is larger than the predetermined threshold.

4. Constraint of the Buffer Usage of SPPL

Buffer usage may be constrained when generating the SPPL list. In an embodiment, the above range cannot exceed the current CTU. In an embodiment, the above range cannot exceed the line buffer of current CTU (one minimum cu above the current CTU). In an embodiment, the left range cannot exceed the current CTU. In an embodiment, the left range cannot exceed one column to the left of the current CTU. In an embodiment, the left range cannot exceed a 4 pixels column to the left of the current CTU. In an embodiment, the left range cannot exceed a minimum cu column to the left of the current CTU.

The techniques, described above, can be implemented as computer software using computer-readable instructions and physically stored in one or more computer-readable media. For example, FIG. 18 shows a computer system (600) suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
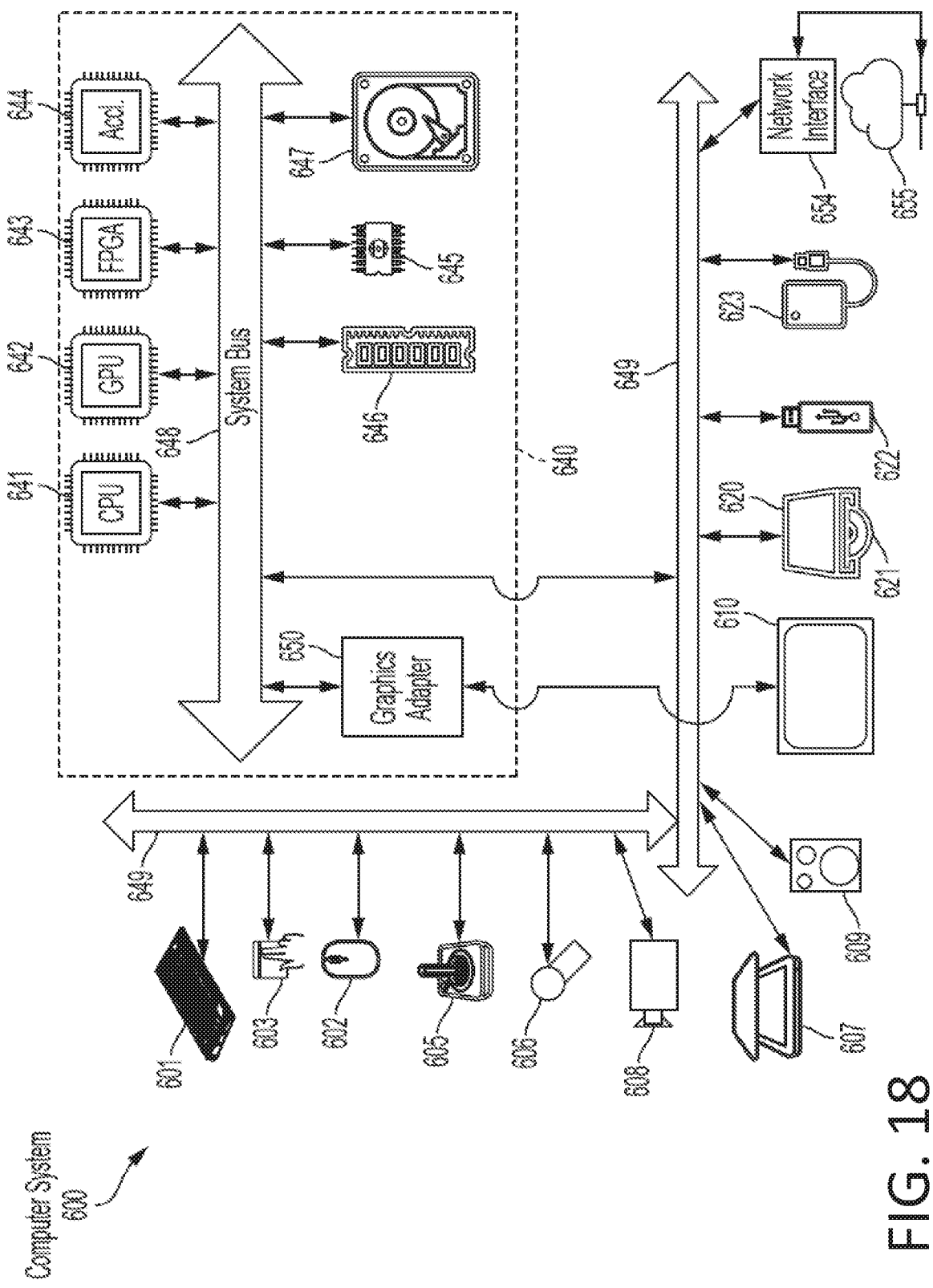
FIG. 18 is a diagram of a computer system suitable for implementing embodiments.

The components shown in FIG. 18 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove, joystick (605), microphone (606), scanner (607), camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data glove, or joystick (605), but there can also be tactile feedback devices that do not serve as input devices). For example, such devices may be audio output devices (such as: speakers (609), headphones (not depicted)), visual output devices (such as screens (610) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (655). Certain protocols and protocol stacks can be used on each of those networks and network interfaces as described above.

Aforementioned human interface devices, human-accessible storage devices, and network interfaces (654) can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), and so forth. These devices, along with Read-only memory (ROM) (645), Random-access memory (646), internal mass storage such as internal non-user accessible hard drives, SSDs, and the like (647), may be connected through a system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). Architectures for a peripheral bus include PCI, USB, and the like. A graphics adapter (650) may be included in the core (640).

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600), and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a video sequence of a coded video stream, performed by at least one processor, using at least one color palette in a palette mode, each of the at least one color palette including at least one luma value or at least one chroma value, the method comprising:
   determining whether a current tree structure is a dual tree structure where a luma color plane has a split tree structure that is different from a split tree structure of a chroma color plane;
   receiving, in a case where the current tree structure is determined to be the dual tree structure, a signal indicating whether a current chroma block is to be decoded using the palette mode;
   determining whether the current chroma block is to be decoded using the palette mode based at least on the signal; and
   decoding at least one image of the video sequence using one or more color palettes of the at least one color palette based on the determining whether the current tree structure is the dual tree structure,
   wherein the decoding comprises decoding, based on determining that the current tree structure is the dual tree structure, the current chroma block using a palette of the at least one color palette in the case where the signal indicates the current chroma block is to be decoded using the palette mode.

2. The method of claim 1, further comprising:
   updating a palette predictor list, the updating comprising:
      providing, in a case where the current tree structure is determined to be the dual tree structure, a first luma value of a first palette of the at least one color palette to the palette predictor list and ignoring all chroma values of the first palette, such that no chroma value of the first palette is provided to the palette predictor list, wherein
   the decoding the at least one image comprises decoding the at least one image of the video sequence by predicting a second palette of the at least one color palette using the palette predictor list.

3. The method of claim 2, further comprising:
   receiving a palette predictor initializer;
   initializing, in the case where the current tree structure is determined to be the dual tree structure, the palette predictor list with a luma value signaled by the palette predictor initializer; and
   setting, in the case where the current tree structure is determined to be the dual tree structure, a chroma value of the palette predictor list with a predefined value, without the palette predictor initializer signaling any chroma value to the palette predictor list.

4. The method of claim 1, further comprising:
   receiving, in a case where the luma color plane is to be decoded while the current tree structure is determined to be the dual tree structure, a signal indicating a luma value of an escape pixel without receiving any signal indicating a chroma value of the escape pixel to be used in the palette mode, wherein the decoding the at least one image comprises using the luma value of the escape pixel in the palette mode.

5. The method of claim 1, wherein
the signal indicating whether the current chroma block is to be decoded using the palette mode is received based on at least one of co-located luma blocks being in the palette mode.

6. The method of claim 1, further comprising:
   determining whether at least one luma block, co-located to the current chroma block, is using the palette mode; and
   determining whether the current chroma block is to be using the palette mode based on the determining whether the at least one luma block is using the palette mode, wherein
   the decoding the at least one image comprises decoding the current chroma block using the palette of the at least one color palette in the case where the current chroma block is to be decoded using the palette mode.

7. The method of claim 6, wherein
the at least one luma block is a plurality of luma blocks co-located to the current chroma block, and
the current chroma block is determined to be using the palette mode based on all of the plurality of luma blocks being determined to be using the palette mode.

8. The method of claim 6, wherein
the at least one luma block is a plurality of luma blocks co-located to the current chroma block, and
the current chroma block is determined to be using the palette mode based on a number of the plurality of luma blocks, greater than a predetermined threshold, being determined to be using the palette mode.

9. The method of claim 1, wherein
the at least one image decoded is a part of a video with three color components,
the at least one color palette comprises a respective color palette table for each of the three color components, and
the method further comprises predicting the respective color palettes tables for each of the three color components using a respective palette predictor list for each of the three color components.

10. A non-transitory computer-readable storage medium storing instructions that cause at least one processor to:
   determine whether a current tree structure is a dual tree structure where a luma color plane has a split tree structure that is different from a split tree structure of a chroma color plane;
   determine whether a current chroma block is to be decoded using a palette mode based on at least a signal that is received, in a case where the current tree structure is determined to be the dual tree structure, and that indicates whether the current chroma block is to be decoded using the palette mode; and
   decode at least one image of a video sequence using one or more color palettes of an at least one color palette in the palette mode based on determining whether the current tree structure is the dual tree structure, wherein
   the instructions are configured to cause the at least one processor to decode, based on determining that the current tree structure is the dual tree structure, the current chroma block using a palette of the at least one color palette in the case where the signal indicates the current chroma block is to be decoded using the palette mode, and
   each of the at least one color palette includes at least one luma value or at least one chroma value.

11. The non-transitory computer-readable storage medium of claim 10, wherein the instructions further cause the at least one processor to:
  update a palette predictor list by providing, in a case where the current tree structure is determined to be the dual tree structure, a first luma value of a first palette of the at least one color palette to the palette predictor list and ignoring all chroma values of the first palette, such that no chroma value of the first palette is provided to the palette predictor list, wherein
  the instructions cause the at least one processor to decode the at least one image of the video sequence by predicting a second palette of the at least one color palette using the palette predictor list.

12. A system comprising:
  at least one processor; and
  memory storing computer code that is for decoding a video sequence of a coded video stream using at least one color palette in a palette mode, each of the at least one color palette including at least one luma value or at least one chroma value, the computer code comprising:
    first code configured to cause the at least one processor to determine whether a current tree structure is a dual tree structure where a luma color plane has a split tree structure that is different from a split tree structure of a chroma color plane;
    second code configured to cause the at least one processor to determine whether a current chroma block is to be decoded using the palette mode based on at least a signal that is received, in a case where the current tree structure is determined to be the dual tree structure, and that indicates whether the current chroma block is to be decoded using the palette mode; and
    third code configured to cause the at least one processor to decode at least one image of the video sequence using one or more color palettes of the at least one color palette in the palette mode based on determining whether the current tree structure is the dual tree structure, wherein
  the third code is configured to cause the at least one processor to decode, based on determining that the current tree structure is the dual tree structure, the current chroma block using a palette of the at least one color palette in the case where the signal indicates the current chroma block is to be decoded using the palette mode.

13. The system of claim 12, wherein the computer code further comprises:
  fourth code configured to cause the at least one processor to update a palette predictor list, by providing, in a case where the current tree structure is determined to be the dual tree structure, a first luma value of a first palette of the at least one color palette to the palette predictor list and ignoring all chroma values of the first palette, such that no chroma value of the first palette is provided to the palette predictor list, wherein
  the third code is configured cause the at least one processor to decode the at least one image of the video sequence by predicting a second palette of the at least one color palette using the palette predictor list.

14. The system of claim 13, wherein the computer code further comprises:
  fifth code configured to cause the at least one processor to initialize, in the case where the current tree structure is determined to be the dual tree structure, the palette predictor list with a luma value signaled by a palette predictor initializer that is received; and
  sixth code configured to cause the at least one processor to set, in the case where the current tree structure is determined to be the dual tree structure, a chroma value of the palette predictor list with a predefined value, without the palette predictor initializer signaling any chroma value to the palette predictor list.

15. The system of claim 12, wherein
  the third code is configured cause the at least one processor to decode the at least one image using a luma value of an escape pixel in the palette mode that is indicated by a signaled received, in a case where the luma color plane is to be decoded while the current tree structure is determined to be the dual tree structure and without receiving any signal indicating a chroma value of the escape pixel to be used in the palette mode.

16. The system of claim 12, wherein
  the signal indicating whether the current chroma block is to be decoded using the palette mode is received based on at least one of co-located luma blocks being in the palette mode.

17. The system of claim 12, wherein the computer code further comprises:
  fourth code configured to cause the at least one processor to determine whether at least one luma block, co-located to the current chroma block, is using the palette mode; and
  fifth code configured to cause the at least one processor to determine whether the current chroma block is to be using the palette mode based on the determining whether the at least one luma block is using the palette mode, wherein
  the third code is configured to cause the at least one processor to decode the current chroma block using the palette of the at least one color palette in the case where the current chroma block is to be decoded using the palette mode.

18. The system of claim 17, wherein
  the at least one luma block is a plurality of luma blocks co-located to the current chroma block, and
  the fifth code is configured to cause the at least one processor to determine the current chroma block to be using the palette mode based on all of the plurality of luma blocks being determined to be using the palette mode.

19. The system of claim 17, wherein
  the at least one luma block is a plurality of luma blocks co-located to the current chroma block, and
  the fifth code is configured to cause the at least one processor to determine the current chroma block to be using the palette mode based on a number of the plurality of luma blocks, greater than a predetermined threshold, being determined to be using the palette mode.

20. The system of claim 12, wherein
  the at least one image decoded is a part of a video with three color components,
  the at least one color palette comprises a respective color palette table for each of the three color components, and
  the computer code further comprises fourth code that is configured to cause the at least one processor to predict the respective color palettes tables for each of the three color components using a respective palette predictor list for each of the three color components.

* * * * *